US008244537B2

(12) United States Patent
Kondo et al.

(10) Patent No.: US 8,244,537 B2
(45) Date of Patent: Aug. 14, 2012

(54) AUDIENCE STATE ESTIMATION SYSTEM, AUDIENCE STATE ESTIMATION METHOD, AND AUDIENCE STATE ESTIMATION PROGRAM

(75) Inventors: Tetsujiro Kondo, Tokyo (JP); Yuji Okumura, Kanagawa (JP); Koichi Fujishima, Saitama (JP); Tomoyuki Ohtsuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 659 days.

(21) Appl. No.: 12/119,844

(22) Filed: May 13, 2008

(65) Prior Publication Data
US 2008/0263580 A1    Oct. 23, 2008

Related U.S. Application Data

(62) Division of application No. 10/602,779, filed on Jun. 24, 2003.

(30) Foreign Application Priority Data

Jun. 26, 2002  (JP) ................................. 2002-186690

(51) Int. Cl.
*G10L 21/00* (2006.01)
*H04H 60/33* (2008.01)

(52) U.S. Cl. ........ 704/270; 704/200; 704/205; 704/211; 725/10; 725/12

(58) Field of Classification Search ................. 704/270, 704/275, 200, 205, 211; 725/10, 12
See application file for complete search history.

(56) References Cited

U.S. PATENT DOCUMENTS

| 4,646,145 | A | * | 2/1987 | Percy et al. ................ 725/24 |
|---|---|---|---|---|
| 4,769,697 | A | * | 9/1988 | Gilley et al. .............. 725/12 |
| 5,121,428 | A | * | 6/1992 | Uchiyama et al. ......... 704/243 |
| 5,162,832 | A | * | 11/1992 | Kakita et al. ............... 396/59 |
| 5,459,814 | A | * | 10/1995 | Gupta et al. ............... 704/233 |
| 5,621,182 | A | * | 4/1997 | Matsumoto ................. 84/610 |
| 5,664,052 | A | * | 9/1997 | Nishiguchi et al. ......... 704/214 |
| 5,771,307 | A | * | 6/1998 | Lu et al. ..................... 382/116 |
| 5,923,337 | A | * | 7/1999 | Yamamoto ................. 345/473 |
| 6,151,571 | A | * | 11/2000 | Pertrushin ................. 704/209 |
| 6,377,618 | B1 | * | 4/2002 | Prasad et al. .............. 375/225 |
| 6,418,408 | B1 | * | 7/2002 | Udaya Bhaskar et al. .... 704/219 |
| 6,585,521 | B1 | * | 7/2003 | Obrador ..................... 434/236 |
| 6,714,909 | B1 | * | 3/2004 | Gibbon et al. .............. 704/246 |
| 2002/0073417 | A1 | | 6/2002 | Kondo et al. |
| 2002/0120454 | A1 | * | 8/2002 | Terasawa et al. ........... 704/275 |
| 2003/0093784 | A1 | * | 5/2003 | Dimitrova et al. .......... 725/10 |

* cited by examiner

*Primary Examiner* — Jialong He

(74) *Attorney, Agent, or Firm* — Frommer Lawrence & Haug LLP; William S. Frommer; Thomas F. Presson

(57) ABSTRACT

Video signal relative to an imaged audience and audio signal according to voices from the audience are generated in an input unit. A characteristic amount detection unit detects information on a movement amount, movement periodicity, a volume, voice periodicity of the audience, and a frequency component of voices from the audience based on the video signal or the audio signal. An estimation unit estimates an audience state based on the detected result. An output unit outputs the estimated result of the audience state. The audience state can be easily estimated without observing the audience state by a person.

33 Claims, 41 Drawing Sheets

F I G. 1
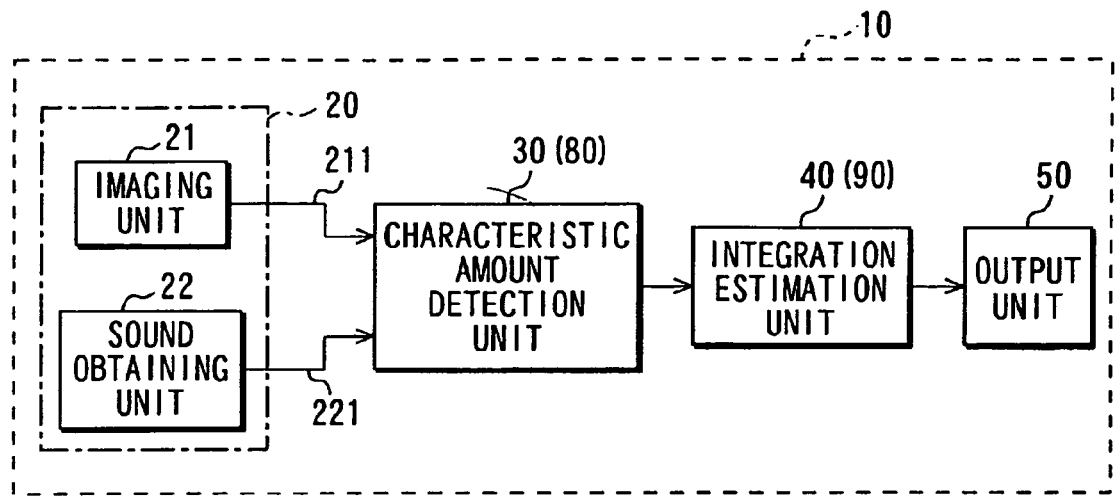
F I G. 2
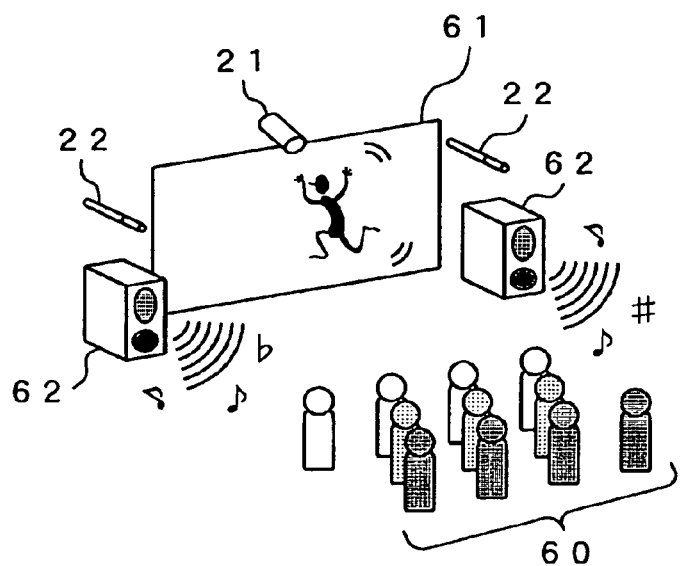

F I G. 4
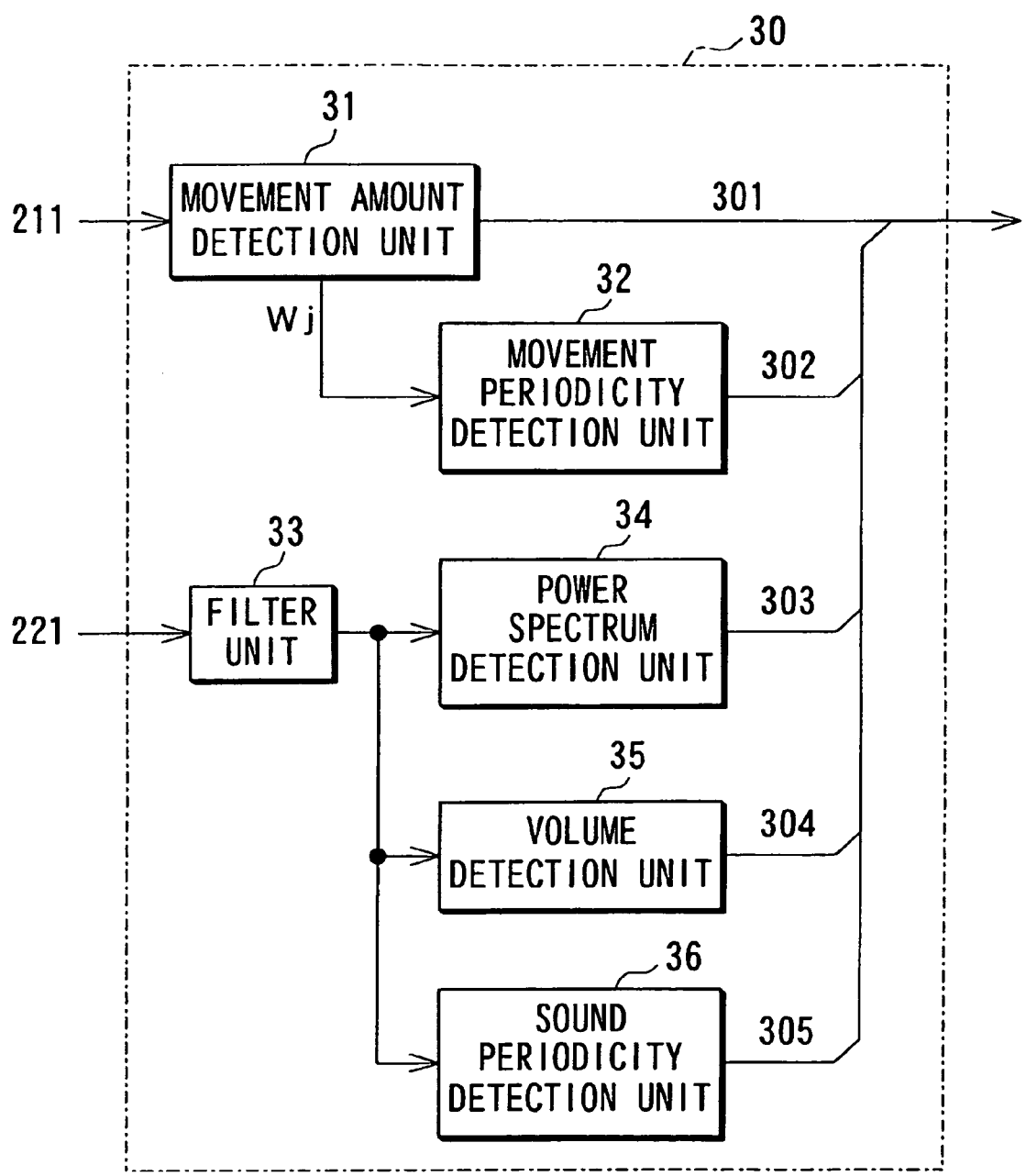

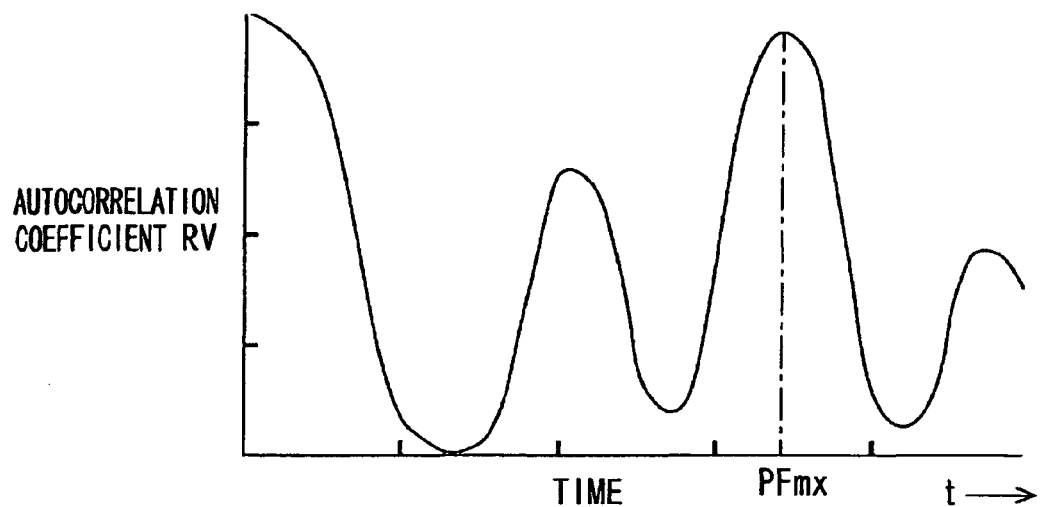
F I G. 10
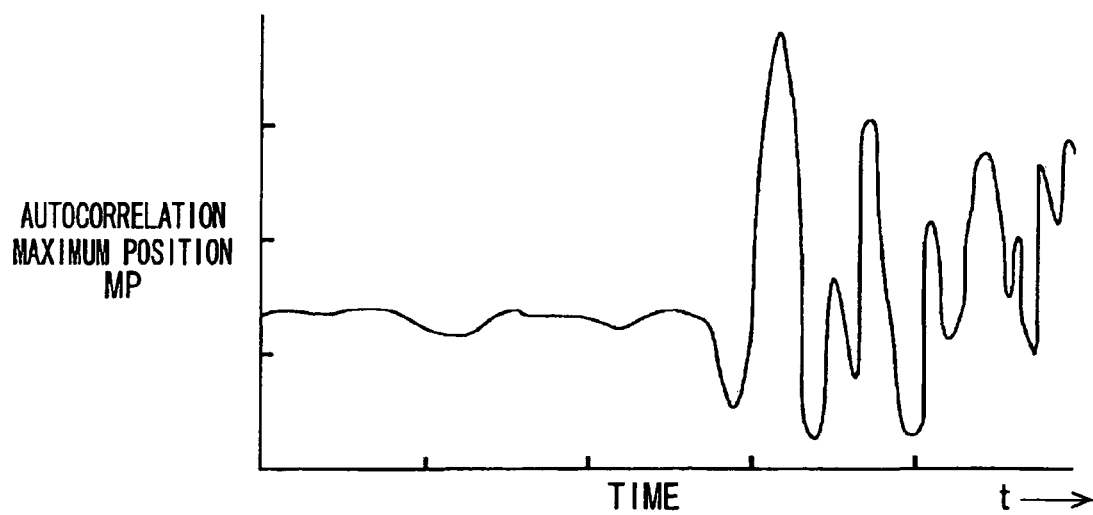
F I G. 11

|  | CHARACTERISTIC AMOUNT 302 | CHARACTERISTIC AMOUNT 305 |
|---|---|---|
| LARGER THAN A REFERENCE LEVEL | "CLAPPING" | |
| NOT LARGER THAN A REFERENCE LEVEL | "BEATING TIME WITH THE HANDS" | |

FIG. 23B

|  | CHARACTERISTIC AMOUNT 301 | CHARACTERISTIC AMOUNT 303 |
|---|---|---|
| LARGER THAN A REFERENCE LEVEL | "CLAPPING" OR "BEATING TIME WITH THE HANDS" | |
| NOT LARGER THAN A REFERENCE LEVEL | "LAUGHING" OR "OTHER MOVEMENT" | |

FIG. 23A

|  | CHARACTERISTIC AMOUNT 304 |
|---|---|
| LARGER THAN A REFERENCE LEVEL | "LAUGHING" |
| NOT LARGER THAN A REFERENCE LEVEL | "OTHER MOVEMENT" |

FIG. 23C

CHARACTERISTIC AMOUNT 301

CHARACTERISTIC AMOUNT 303

CHARACTERISTIC
AMOUNT 302

CHARACTERISTIC
AMOUNT 305

CHARACTERISTIC
AMOUNT 304

FIG. 26

| | CHARACTERISTIC AMOUNTS USED FOR ESTIMATION | | | | |
|---|---|---|---|---|---|
| | AT ESTIMATION OF BEATING TIME WITH THE HANDS AND CLAPPING, AND LAUGHING AND OTHER MOVEMENT | | AT ESTIMATION OF BEATING TIME WITH THE HANDS AND CLAPPING | | CHARACTERISTIC AMOUNT 304 |
| | CHARACTERISTIC AMOUNT 301 | CHARACTERISTIC AMOUNT 303 | CHARACTERISTIC AMOUNT 302 | CHARACTERISTIC AMOUNT 305 | |
| CONCERT | ○ | | | ○ | ○ |
| MOVIE THEATER | | ○ | | ○ | ○ |
| SPORTS RELAY | ○ | | ○ | | ○ |
| ⋮ | | | | | |

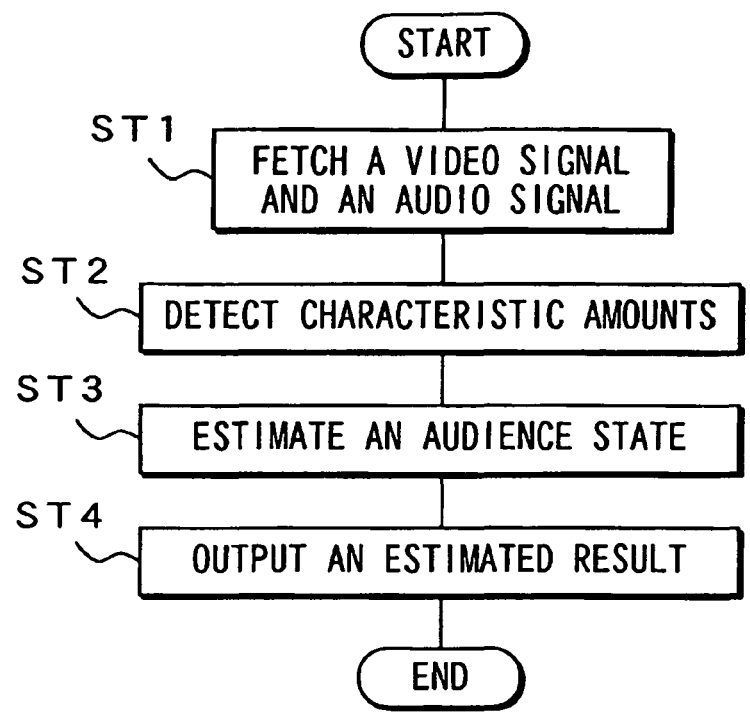
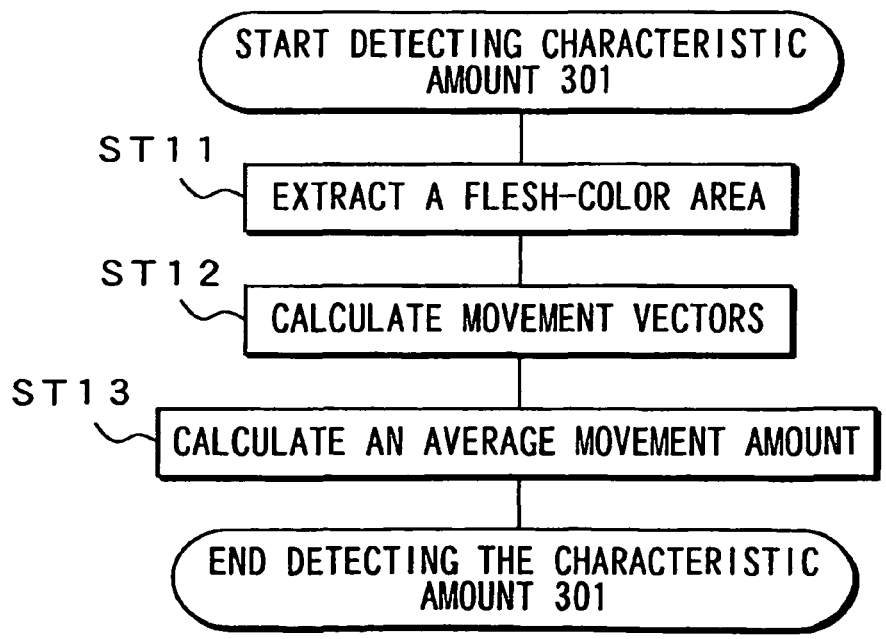

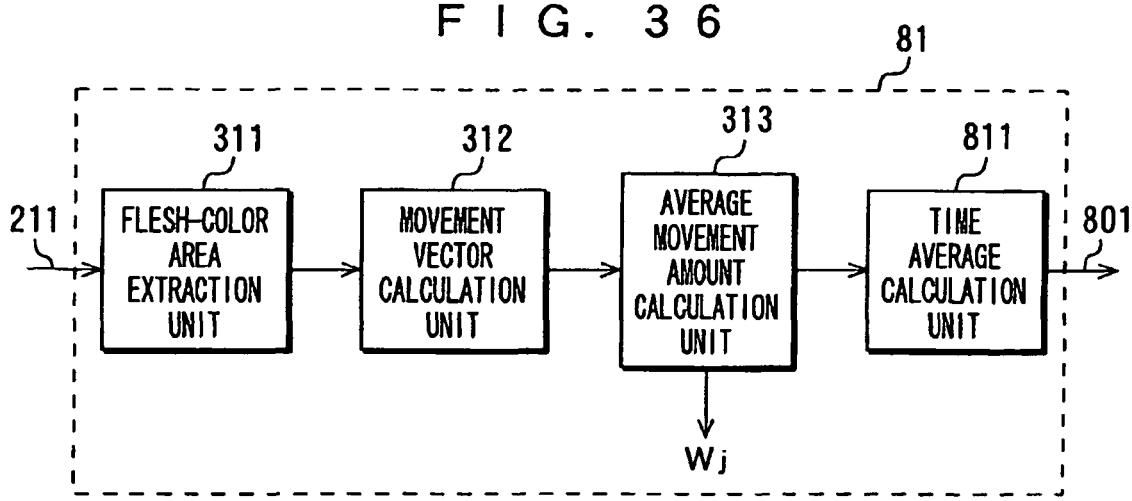
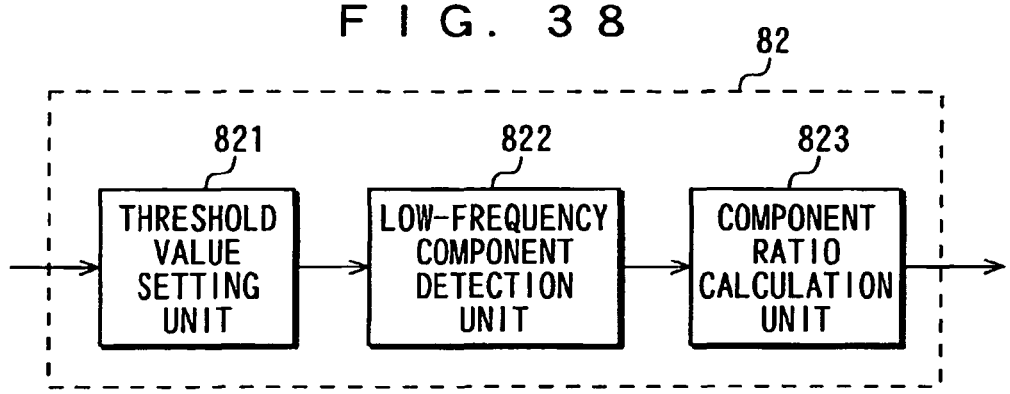
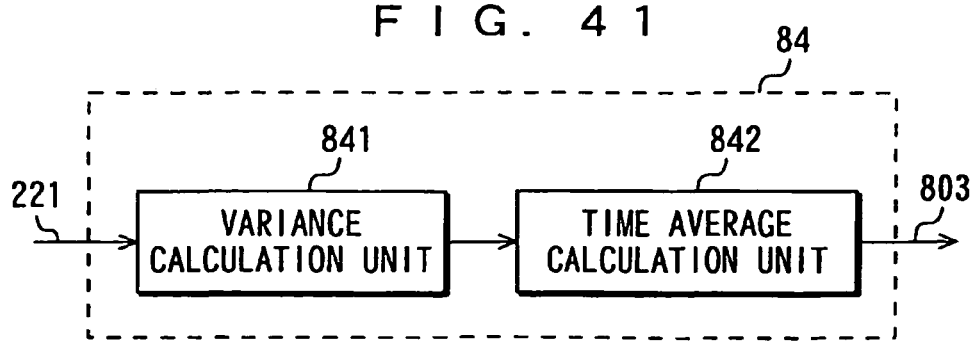

CHARACTERISTIC
AMOUNT 801

CHARACTERISTIC
AMOUNT 801

CHARACTERISTIC AMOUNT 803

CHARACTERISTIC AMOUNT 803

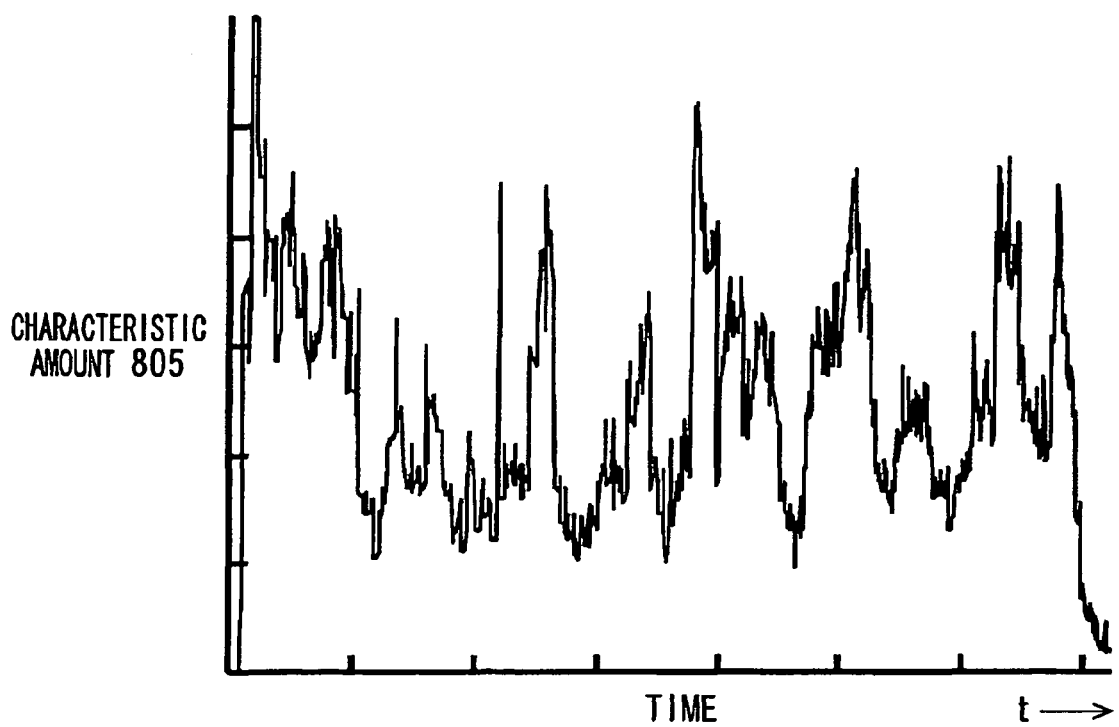
F I G. 46

CHARACTERISTIC AMOUNT 801

CHARACTERISTIC AMOUNT 801

CHARACTERISTIC
AMOUNT 803

CHARACTERISTIC
AMOUNT 803

CHARACTERISTIC AMOUNT 802

CHARACTERISTIC AMOUNT 804

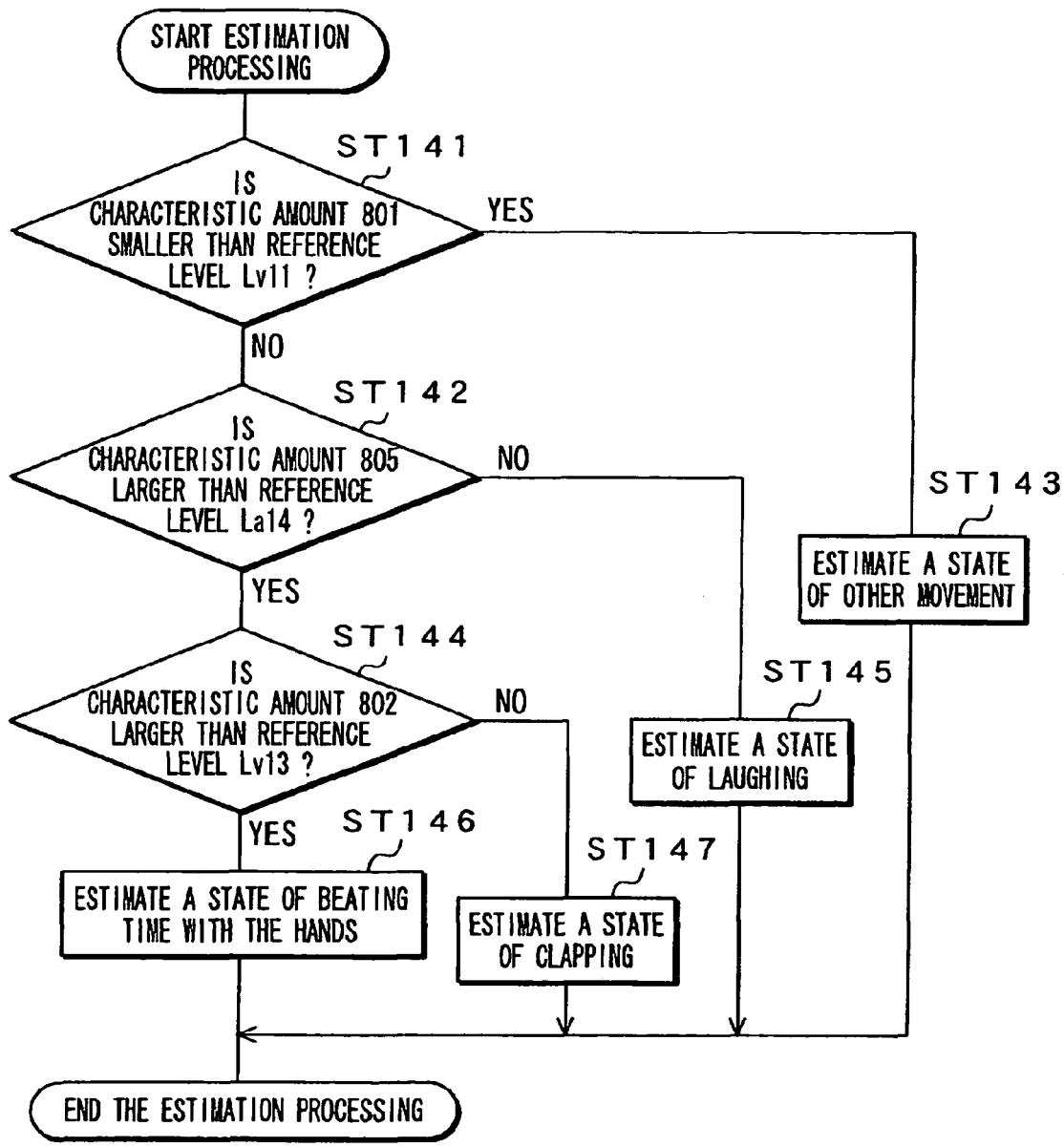

US 8,244,537 B2

AUDIENCE STATE ESTIMATION SYSTEM, AUDIENCE STATE ESTIMATION METHOD, AND AUDIENCE STATE ESTIMATION PROGRAM

This is a division of application Ser. No. 10/602,779, filed Jun. 24, 2003, which is entitled to the priority filing date of Japanese application 2002-186690, filed in Japan on Jun. 26, 2002, the entirety of which is incorporated herein by reference.

BACKGROUND OF THE INVENTION

1. Field of the Invention

The present invention relates to an audience state estimation system, an audience state estimation method, and an audience state estimation program. More specifically, the present invention relates to an audience state estimation system or the like wherein a movement amount, movement periodicity, a volume and voice periodicity of an audience are detected on the basis of a video signal obtained by imaging the audience and an audio signal according to sound including voice from the audience, and an audience state is estimated on the basis of the detected result.

2. Description of Related Art

In a prior art, when providing contents of a movie or a program, an image display device and a sound output device are used to perform image display and sound provision based on a previously-created video signal or audio signal.

To effectively provide contents, it is important to grasp an audience state. For example, grasping how scenes cause the audience to laugh or clap allows the contents to be more effectively provided with adding an effective sound and the like according to the reaction state of the audience in providing the contents. A producer or creator of contents can easily discriminate between a laughing scene and a clapping scene from the grasped reaction state of the audience and can effectively make use of the reaction state of the audience in creating new contents. When using the reaction state of the audience in a contents creation stage, more effective contents creation can be performed.

When grasping the reaction state of the audience, in the prior art, a person must observe the audience to discriminate in which scene the reaction state occurs and how it is. It is impossible to easily grasp the reaction state of the audience.

SUMMARY OF THE INVENTION

The present invention has an object of providing an audience state estimation system, an audience state estimation method, and an audience state estimation program, which can easily estimate an audience state without observing the audience state by a person.

An audience state estimation system according to a first aspect of the present invention has imaging device for imaging an audience and generating a video signal relative to the audience thus imaged, movement amount detection device for detecting a movement amount of the audience based on the video signal, and estimation device for estimating an audience state based on the movement amount.

According to this invention, the imaging device images the audience and generates the video signal relative to the audience thus imaged. The movement amount detection device also detects the movement amount of the audience based on the video signal. The estimation device then estimates the audience state such as a state of beating time with the hands or a state of clapping based on the movement amount. Thus, utilizing the movement amount detection device for detecting the movement amount of the audience and the estimation device for estimating the audience state based on the movement amount allows the audience state to be easily estimated without observing the audience state by any person.

An audience state estimation system according to a second aspect of the present invention has imaging device for imaging an audience and generating a video signal relative to the audience thus imaged, movement periodicity detection device for detecting movement periodicity of the audience based on the video signal, and estimation device for estimating an audience state based on the movement periodicity of the audience.

According to the invention, the imaging device images the audience and generates the video signal relative to the audience thus imaged. The movement periodicity detection device detects movement periodicity of the audience based on the video signal. The estimation device estimates the audience state such as a state of beating time with the hands or a state of clapping based on the movement periodicity of the audience. Thus, utilizing the movement periodicity detection device for detecting movement periodicity of the audience and the estimation device for estimating the audience state based on the movement periodicity of the audience allows the audience state to be easily estimated without observing the audience state by any person.

An audience state estimation system according to a third aspect of the present invention has sound-obtaining device for obtaining sound from an audience and generating an audio signal according to the sound thus obtained, volume detection device for detecting a volume of the sound from the audience based on the audio signal, and estimation device for estimating an audience state based on the volume.

According to the invention, the sound-obtaining device obtains sound from the audience and generates the audio signal according to the sound thus obtained. The volume detection device detects a volume of the sound from the audience based on the audio signal. The estimation device estimates an audience state such as a state of laughing based on the volume. Thus, utilizing the volume detection device for detecting the volume of the sound from the audience and the estimation device for estimating the audience state based on the volume allows the audience state to be easily estimated without observing the audience state by any person.

An audience state estimation system according to a fourth aspect of the invention has sound-obtaining device for obtaining sound from an audience and generating an audio signal according to the sound thus obtained, sound periodicity detection device for detecting sound periodicity from the audience based on the audio signal, and estimation device for estimating an audience state based on the sound periodicity.

According to the invention, the sound-obtaining device obtains sound from the audience and generates the audio signal according to the sound thus obtained. The sound periodicity detection device detects sound periodicity from the audience based on the audio signal. The estimation device estimates the audience state such as a state of clapping based on the sound periodicity. Thus, utilizing the sound periodicity detection device for detecting sound periodicity from the audience and the estimation device for estimating the audience state based on the sound periodicity allows the audience state to be easily estimated without observing the audience state by any person.

An audience state estimation system according to a fifth aspect of the invention has sound-obtaining device for obtaining sound from an audience and generating an audio signal according to the sound thus obtained, spectrum detection device for performing Fourier transform on the audio signal and detecting the center of gravity of the Fourier transformed result, and estimation device for estimating an audience state based on the center of gravity.

According to the invention, the sound-obtaining device obtains sound from the audience and generates the audio signal according to the sound thus obtained. The spectrum detection device performs Fourier transform on the audio signal and detects the center of gravity of the Fourier transformed result. The estimation device estimates the audience state such as a state of beating time with the hands or a state of clapping based on the center of gravity. Thus, utilizing the spectrum detection device for performing Fourier transform on the audio signal and detecting the center of gravity of the Fourier transformed result and the estimation device for estimating the audience state based on the center of gravity allows the audience state to be easily estimated without observing the audience state by any person.

An audience state estimation system according to a sixth aspect of the invention has sound-obtaining device for obtaining sound from an audience and generating an audio signal according to the sound thus obtained, component ratio detection device for performing Fourier transform on the audio signal and detecting a high-frequency to low-frequency component ratio by calculating the ratio based on the Fourier transformed result, and estimation device for estimating an audience state based on the high-frequency to low-frequency component ratio.

According to the invention, the sound-obtaining device obtains sound from the audience and generates the audio signal according to the sound thus obtained. The component ratio detection device performs Fourier transform on the audio signal and detects a high-frequency to low-frequency component ratio by calculating the ratio based on the Fourier transformed result. The estimation device estimates the audience state such as a state of beating time with the hands or a state of clapping based on the high-frequency to low-frequency component ratio. Thus, utilizing the component ratio detection device for performing Fourier transform on the audio signal and detecting a high-frequency to low-frequency component ratio and the estimation device for estimating the audience state based on the high-frequency to low-frequency component ratio allows the audience state to be easily estimated without observing the audience state by any person.

An audience state estimation system according to a seventh aspect of the invention has input device for inputting and generating at least one of video signal obtained by imaging an audience and audio signal obtained according to sound from the audience, characteristic amount detection device for detecting, based on the video signal, at least one of a movement amount and movement periodicity of the audience and detecting, based on the audio signal, a piece of information on at least one of a volume of sound from the audience, periodicity of the sound, and a frequency component of the sound, and estimation device for estimating an audience state based on the detected result of the characteristic amount detection device.

According to the invention, the input device inputs and generates video signal obtained by imaging an audience and/or audio signal obtained according to sound from said audience. The characteristic amount detection device detects, based on the video signal, any one of or both of a movement amount and movement periodicity of the audience and detects, based on the audio signal, a piece or pieces of information on a volume of sound from the audience, periodicity of the sound, and a frequency component of the sound. The estimation device estimates the audience state such as a state of beating time with the hands, a state of clapping or a state of laughing based on the detected result of the characteristic amount detection device. Thus, utilizing the characteristic amount detection device for detecting any one of or both of a movement amount and movement periodicity of the audience and detecting a piece or pieces of information on a volume of sound from the audience, periodicity of the sound, and a frequency component of the sound and the estimation device for estimating the audience state based on the detected result of the characteristic amount detection device allows the audience state to be easily estimated without observing the audience state by any person.

An audience state estimation method according to an eighth aspect of the invention includes imaging an audience and generating a video signal relative to the audience thus imaged, detecting a movement amount of the audience based on the video signal, and estimating an audience state based on the movement amount.

An audience state estimation method according to a ninth aspect of the invention includes imaging an audience and generating a video signal relative to the audience thus imaged, detecting movement periodicity of the audience based on the video signal, and estimating an audience state based on the movement periodicity of the audience.

An audience state estimation method according to a tenth aspect of the invention includes obtaining sound from an audience and generating an audio signal according to the sound thus obtained, detecting a volume of the sound from said audience based on the audio signal, and estimating an audience state based on the volume.

An audience state estimation method according to an eleventh aspect of the invention includes obtaining sound from an audience and generating an audio signal according to the sound thus obtained, detecting sound periodicity from the audience based on the audio signal, and estimating an audience state based on the sound periodicity.

An audience state estimation method according to a twelfth aspect of the invention includes obtaining sound from an audience and generating an audio signal according to the sound thus obtained, performing Fourier transform on the audio signal and detecting the center of gravity of the Fourier transformed result, and estimating an audience state based on the center of gravity.

An audience state estimation method according to a thirteenth aspect of the invention includes obtaining sound from an audience and generating an audio signal according to the sound thus obtained, performing Fourier transform on the audio signal and calculating a high-frequency to low-frequency component ratio based on the Fourier transformed result, and estimating an audience state based on the high-frequency to low-frequency component ratio.

An audience state estimation method according to a fourteenth aspect of the invention including generating a video signal obtained by imaging an audience and/or an audio signal according to sound from the audience, detecting, based on the video signal, any one of or both of a movement amount and movement periodicity of the audience, detecting, based on the audio signal, a piece or pieces of information on a volume of sound from the audience, periodicity of the sound, and a frequency component of the sound, and estimating an audience state based on the detected result.

According to the inventions, in the audience state estimation methods, the video signal is obtained by imaging an audience and/or an audio signal is obtained according to sound from the audience. For example, a movement amount and movement periodicity of the audience and a volume of sound and periodicity of the sound from the audience are detected based on the video signal and/or the audio signal. It can be estimated which of states of beating time with the hands, of clapping and of laughing the audience stays in based on the detected result.

An audience state estimation program according to a fifteenth aspect of the invention, estimates an audience state by processing information. The program comprises a step of performing detection, based on the video signal obtained by imaging the audience, for any one of or both of a movement amount and movement periodicity of the audience, and/or detection, based on the audio signal according to sound from the audience, for a piece or pieces of information on a volume of sound from the audience, periodicity of the sound, and a frequency component of the sound, and a step of estimating the audience state based on the detected result.

According to the program of the invention, the detection for any one of or both of a movement amount and movement periodicity of the audience is performed based on the video signal obtained by imaging the audience, and/or the detection of a piece or pieces of information on a volume of sound from the audience, periodicity of the sound, and a frequency component of the sound is performed based on the audio signal according to sound from the audience. The audience state is then estimated based on the detected result.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 1 is a diagram showing a configuration of an audience state estimation system according to an embodiment of the invention;
FIG. 2 is a diagram of assistance in explaining an input unit;
FIG. 4 is a diagram showing a configuration of a characteristic amount detection unit;
FIG. 10 is a graph showing a change in the autocorrelation coefficient;
FIG. 11 is a graph showing a change in the autocorrelation maximum position;
FIGS. 23A to 23C are diagrams each showing a table for estimation operation;
FIG. 26 is a diagram showing a table for the relation between the characteristic amounts used for estimating an audience state and contents provision states;
FIG. 28 is flow chart showing entire audience state estimation processing;
FIG. 29 is flow chart showing the detection processing for the characteristic amount 301;
FIG. 36 is a diagram showing a configuration of another movement amount detection unit;
FIG. 38 is a diagram showing a configuration of another movement periodicity detection unit;
FIG. 41 is a diagram showing a configuration of a volume detection unit;
FIG. 46 is a graph showing a change in characteristic amount 805.

FIG. 59 is flow chart showing audience state estimation processing (using the characteristic amount 805).

DETAILED DESCRIPTION OF THE PREFERRED EMBODIMENTS

Figure 3:
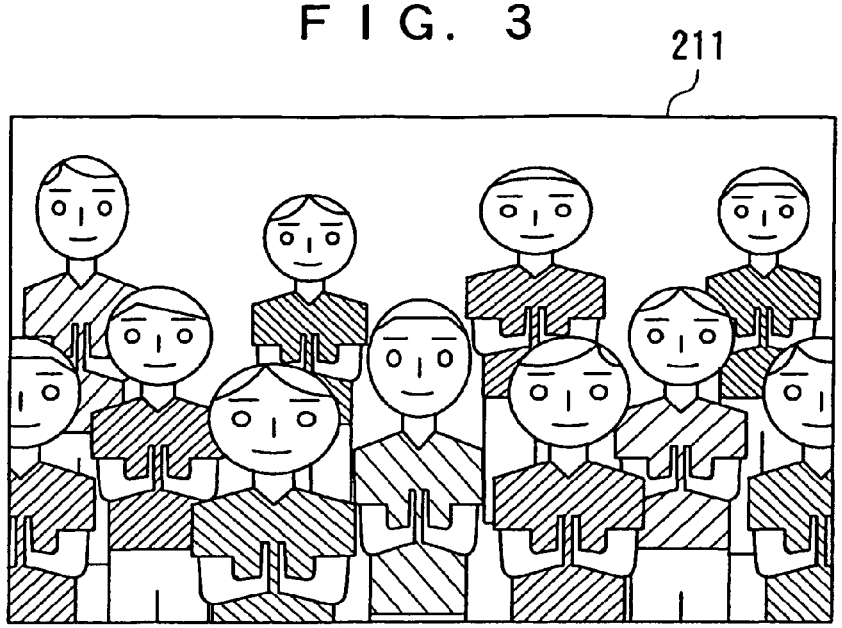
FIG. 3 is a diagram showing an imaged audience side.

Embodiments of the present invention will be described below with reference to the attached drawings.

FIG. 1 shows a configuration of an audience state estimation system 10 embodying the invention. An input unit 20 of the audience state estimation system 10 monitors an audience state using a video camera and a microphone to generate monitored information. For example, an audience is imaged to generate a video signal relative to imaged audience (hereinafter, referred to as "video signal") 211 as the monitored information. Sound from the audience is obtained to generate an audio signal 221 as the monitored information. A characteristic amount detection unit 30 detects plural characteristic amounts based on the video signal 211 and the audio signal 221 as the monitored information. An integral estimation unit 40 estimates an audience state based on the detected plural characteristic amounts to supply it to an output unit 50. The output unit 50 outputs the estimated result of the estimation unit 40.

Using FIG. 2, the operation of the input unit 20 will be described. The image of a movie or a TV program is displayed on an image display device 60 provided in front of an audience 60. Sound is outputted from speakers 62. The input unit 20 has an imaging unit 21 and sound obtaining units 22. The imaging unit 21 is provided in front of the audience 60 to be estimated for the audience state, and generates the video signal 211 relative to an image showing the imaged audience 60, as shown in FIG. 3. The sound obtaining units 22 obtain sound including voice from the audience 60 side to generate the audio signal 221. The thus-generated video signal 211 and audio signal 221 are supplied to the characteristic amount detection unit 30.

FIG. 4 shows a configuration of the characteristic amount detection unit 30. The characteristic amount detection unit 30 detects characteristic amounts about a magnitude and periodicity of movement of the audience 60, a volume and periodicity of the sound including voice, and a frequency component of the sound at the audience 60 side.

A movement amount detection unit 31 of the characteristic amount detection unit 30 detects characteristic amount 301 showing a magnitude of movement. A movement periodicity detection unit 32 detects characteristic amount 302 showing periodicity of movement. A power spectrum detection unit 34 detects characteristic amount 303 about a frequency component of sound. A volume detection unit 35 detects characteristic amount 304 showing a volume of sound. A sound periodicity detection unit 36 detects characteristic amount 305 showing periodicity of sound.

Figure 5:
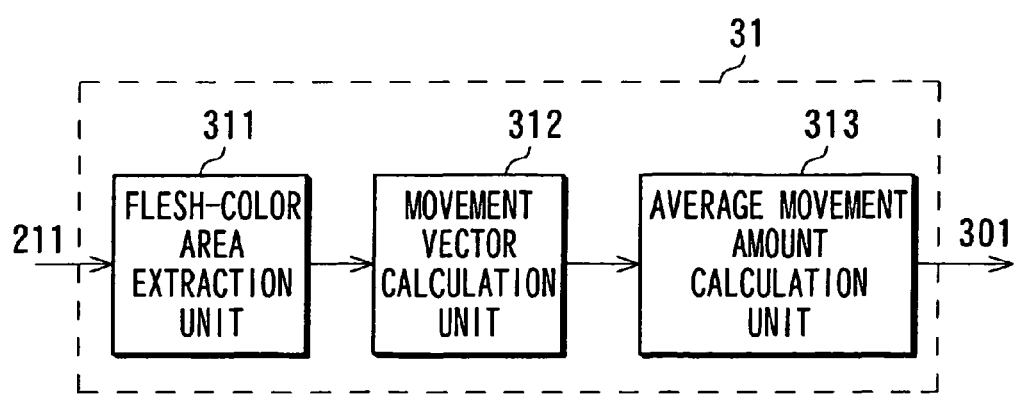
FIG. 5 is a diagram showing a configuration of a movement amount detection unit.

FIG. 5 shows a configuration of the movement amount detection unit 31. A flesh-color area extraction unit 311 discriminates a pixel range capable of identifying flesh color in an ROB color space, a YIQ color space or an HSV color space. For example, in the RGB color space, threshold values showing a red signal range, a green signal range, and a blue signal range, which identify flesh color, are set to discriminate, for each pixel, whether the signal levels of three primary-colors signals generated based on the video signal 211 are within the area of flesh color or not, thereby extracting the pixel range (hereinafter, called a "flesh-color area") which can identify flesh color.

Figure 6:
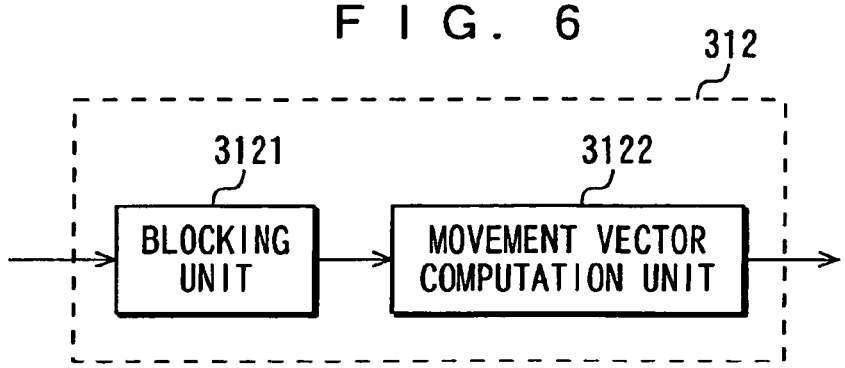
FIG. 6 is a diagram showing a configuration of a movement vector calculation unit.

FIG. 6 shows an example of configuration of a movement vector calculation unit 312 of the movement amount detection unit 31. This movement vector calculation unit 312 includes a blocking unit 3121 and a movement vector computation unit 3122, for example, as shown in FIG. 6. The movement vector calculation unit 312 divides the extracted flesh-color area into blocks to calculate a movement vector of the flesh-color area for each of the blocks. For example, the face unit and the hand unit of the audience is a block, respectively, and then, block matching of an image with the next frame (or the previous frame) image is performed for each of the blocks. The movement direction and the movement amount when the images of the blocks are most matched with each other are movement vector MV. Two-dimensional movement vector MVi is detected, as shown in Formula (1).

$$Vi = (ui, vi) \qquad (1)$$

In Formula (1), "i" indicates a block number. When the number of blocks is "m+1", "i=0 to m". "u" is a horizontal movement amount. "v" is a vertical movement amount. Calculation of the movement vector is not limited to the block matching method. Other methods such as a representative point matching method or a gradient method may be used.

An average movement amount calculation unit 313 of the movement amount detection unit 31 calculates a movement average of magnitudes of the movement vectors sequentially using the movement vectors for a fixed period of the blocks in a frame, thereby calculating average movement amount Wj, based on Formula (2). The characteristic amount 301 of the calculated average movement amount Wj is detected. When calculating the movement average, weighting can also be performed to calculate the average movement amount Wj.

$$Wj = \sum_{i=0}^{m} \frac{\sqrt{ui^2 + vi^2}}{m} \qquad (2)$$

Figure 7:
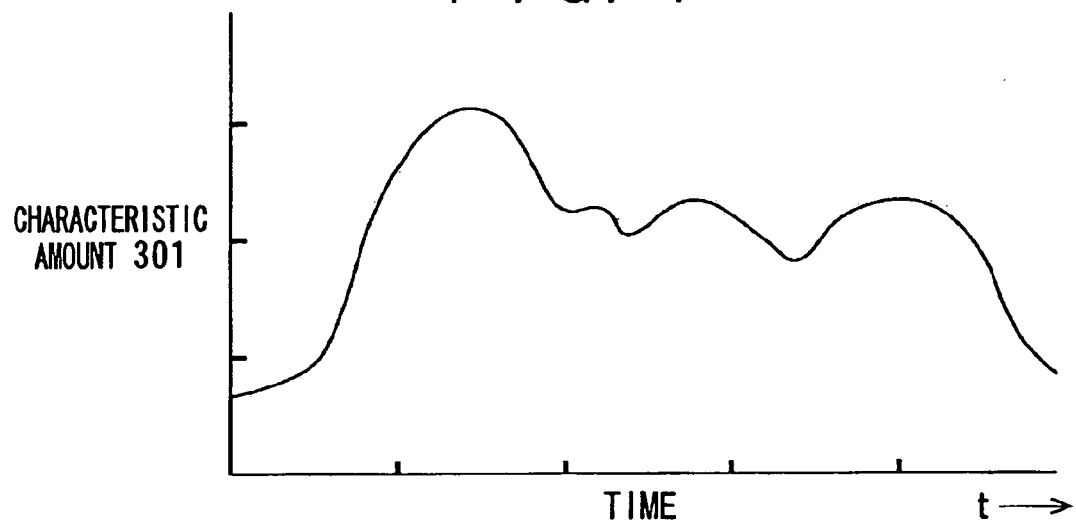
FIG. 7 is a graph showing a change in characteristic amount 301.

FIG. 7 shows a change in the characteristic amount 301, that is, the average movement amount Wj calculated for each frame.

In Formula (2), the average movement amount Wj is calculated by adding the horizontal movement amount and the vertical movement amount. The average movement amount Wj may be calculated based on any one of the horizontal movement amount and the vertical movement amount.

Figure 8:
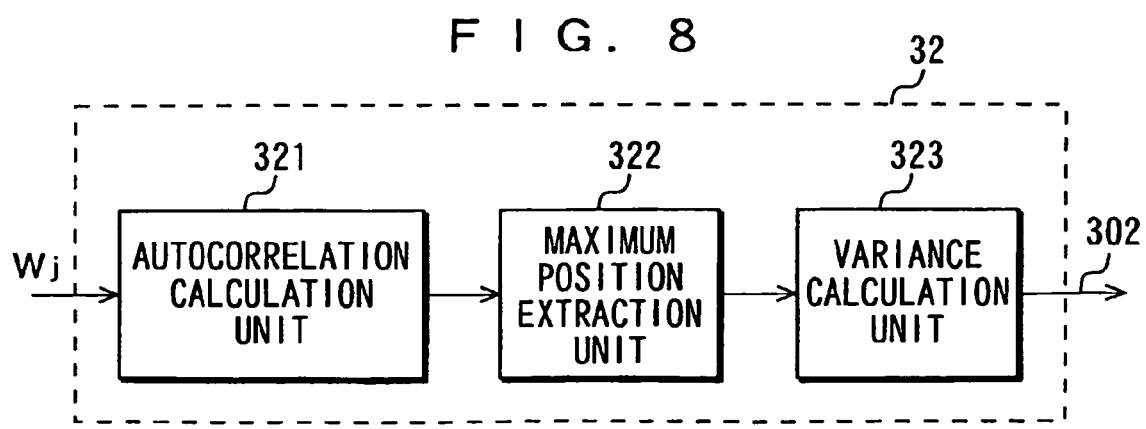
FIG. 8 is a diagram showing a configuration of a movement periodicity detection unit.

FIG. 8 shows a configuration of the movement periodicity detection unit 32. An autocorrelation calculation unit 321 calculates autocorrelation coefficient RV for each frame based on following Formula (3) using the average movement amount Wj obtained by the movement amount detection unit 31.

$$RV = \frac{\sum_{j=0}^{n-1-k} Wj \cdot W(j+k)}{\sqrt{\sum_{j=0}^{n-1-k} Wj^2} \sqrt{\sum_{j=0}^{n-1-k} W(j+k)^2}} \tag{3}$$

Figure 9A:
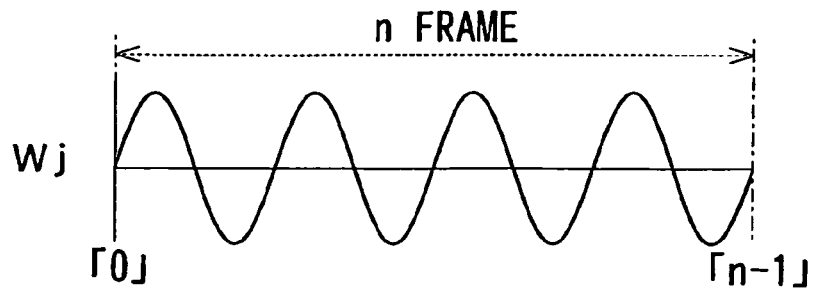
FIGS. 9A to 9F are graphs each for explaining the calculation operation of an autocorrelation coefficient.
Figure 9B:
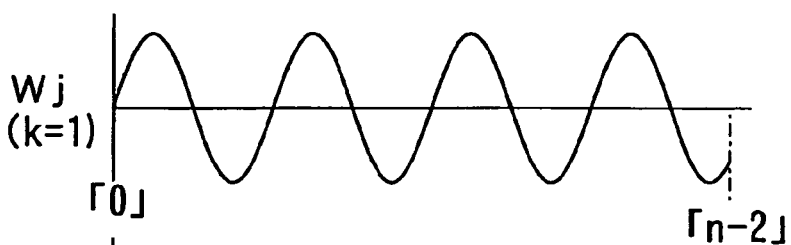
Figure 9C:
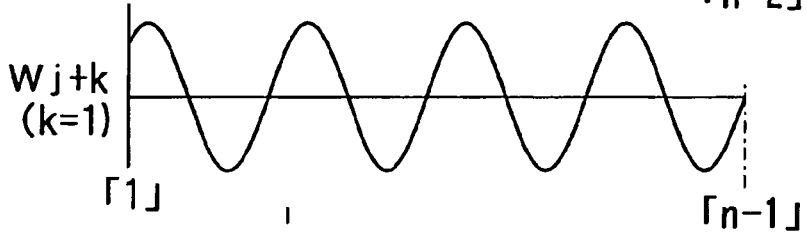
Figure 9D:
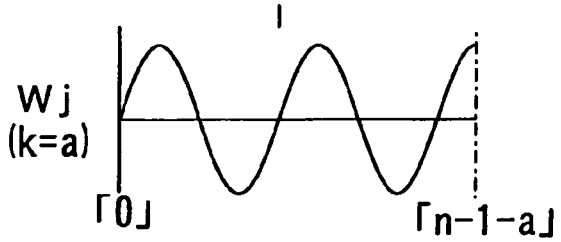
Figure 9E:
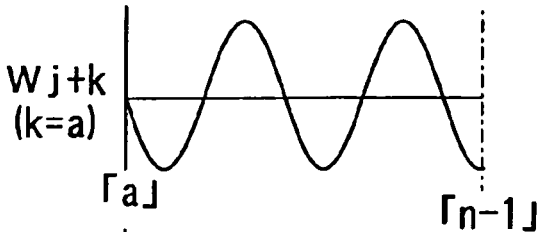
Figure 9F:
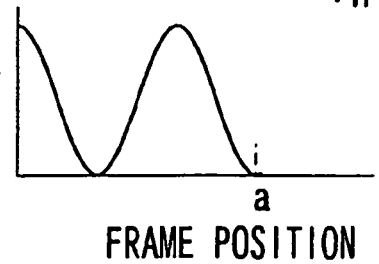

Using FIGS. 9A to 9F, the calculation operation of the autocorrelation coefficient shown in Formula (3) will be described. For simplifying the description, the average movement amount Wj is a sine wave, as shown in FIG. 9A. When "k=1", the average movement amounts Wj from the first "0" frame to (n−2) frame shown in FIG. 9B and average movement amounts Wj+k from "1" frame to (n−1) frame shown in FIG. 9C are used to calculate the autocorrelation coefficients RV. When "k=a", the average movement amounts Wj from the first "0" frame to (n−1−a) frame shown in FIG. 9D and the average movement amounts Wj+k from "a" frame to (n−1) frame shown in FIG. 9E are used to calculate the autocorrelation coefficients RV. The average movement amount used for calculating the autocorrelation coefficient RV is sequentially changed to obtain the change in the autocorrelation coefficient RV from "k=1" to "k=a" frame, as shown in FIG. 9F.

A maximum position extraction unit 322 detects a frame position as a maximum value from the calculated autocorrelation coefficients RV. For example, when the change in the autocorrelation coefficients RV calculated based on Formula (3) are a waveform shown in FIG. 10, frame position PFmx is autocorrelation maximum position MP. In addition, the positions of the average movement amounts Wj for calculating the autocorrelation coefficients are sequentially shifted in the time direction to perform the same processing, and then, the autocorrelation maximum positions MP are sequentially detected. The change in the autocorrelation maximum position MP in the time direction is shown in FIG. 11.

Figure 12:
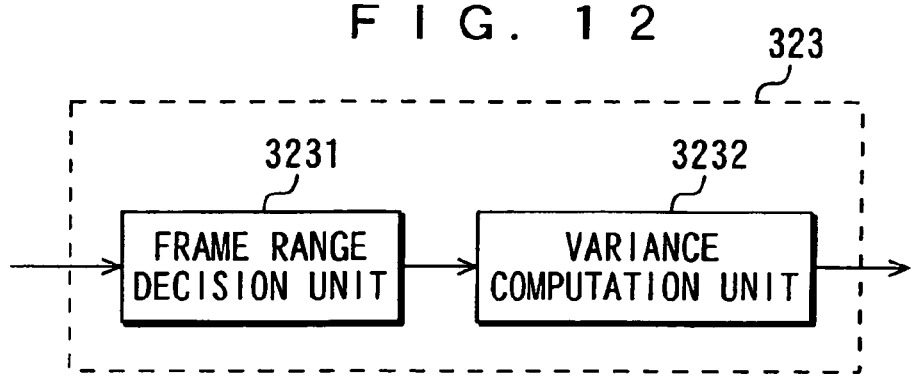
FIG. 12 is a diagram showing a configuration of a variance calculation unit.

FIG. 12 shows an example of configuration of a variance calculation unit 323. This variance calculation unit 323 includes a frame range decision unit 3231 and a variance computation unit 3232, for example, as shown in FIG. 12. The variance calculation unit 323 calculates variance of the autocorrelation maximum position MP. When calculating variance Vp, a frame range used for calculating the variance according to periodicity of an audience state detected is decided. To detect the periodicity, at least a signal of a window width (frame range) above a period detected must be used. Otherwise, the periodicity cannot be detected. Increasing the window width can improve the accuracy of the detected result and can obtain a correct detected result when periodic fluctuation occurs. Increasing the window width slows a response to the change in behavior in a short time so that the processing time is longer. Preferably, the window width is about several times the period detected. When estimating beating time with the hands of the audience 60 as an audience state, considering that the period of the beating time with the hands is about 0.5 seconds, about two seconds is the window width used for calculating the variance.

When the window width set here is, for example, ±(q/2) frame to p frame, an average of the autocorrelation maximum positions of the window width is MPav, and the autocorrelation maximum position of the j-th frame is MPj, the variance Vp can be calculated based on Formula (4).

$$Vp = \frac{1}{q} \sum_{j=-p(q/2)}^{p+(q/2)} (MPj - MPav)^2 \tag{4}$$

Figure 13:
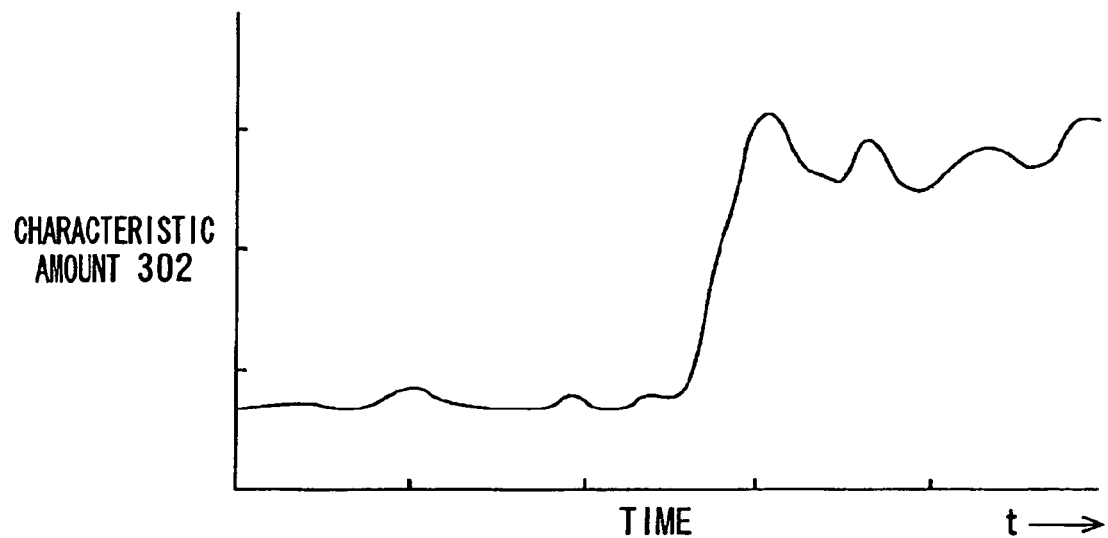
FIG. 13 is a graph showing a change in characteristic amount 302.

Thus, the movement periodicity detection unit 32 calculates the variance Vp of the autocorrelation maximum position MP of the average movement amount. The variance Vp is set as the characteristic amount 302. When the characteristic amount 302 is large, the periodic fluctuation is large. When the characteristic amount 302 is small, the periodic fluctuation is small. The characteristic amount 302 may show the fluctuation state of a signal period. For example, the standard deviation of the autocorrelation maximum position MP can also be used. FIG. 13 shows a change in the characteristic amount 302 that is detected based on Formula (4).

The characteristic amount based on the audio signal 221 will be described. In FIG. 4, a filter unit 33 performs band limitation on the audio signals 221 to extract the component of a frequency band suitable for generating the characteristic amounts by the power spectrum detection unit 34, the volume detection unit 35 and the sound periodicity detection unit 36. When a component other than the frequency band is not included in the audio signals 221 or the component other than the frequency band is small so that the correct characteristic amounts may be generated, the filter unit 33 may not be provided.

Figure 14:
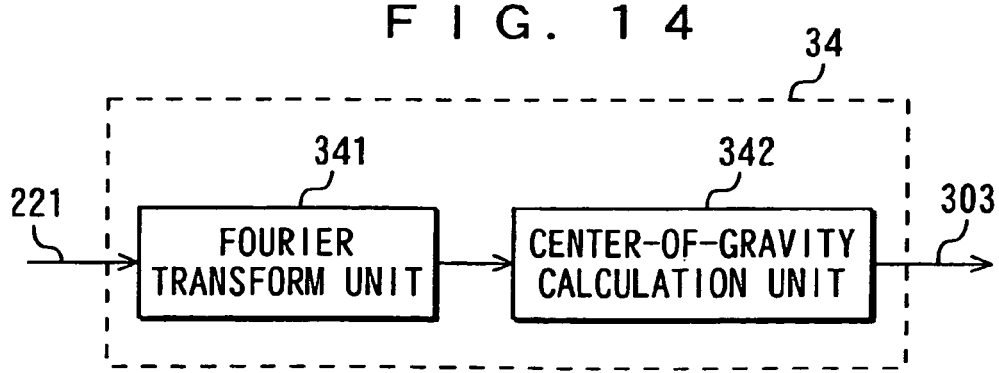
FIG. 14 is a diagram showing a configuration of a power spectrum detection unit.

The power spectrum detection unit 34 uses the audio signals 221 supplied via the filter unit 33 to calculate the center of gravity based on the audio signals 221 for a time set according to an audience state to be detected. When a state of "laughing" of the audience 60 is detected, a time length is set so as to include a frequency component of laughter when calculating the center of gravity. FIG. 14 shows a configuration of the power spectrum detection unit 34.

Figure 15:
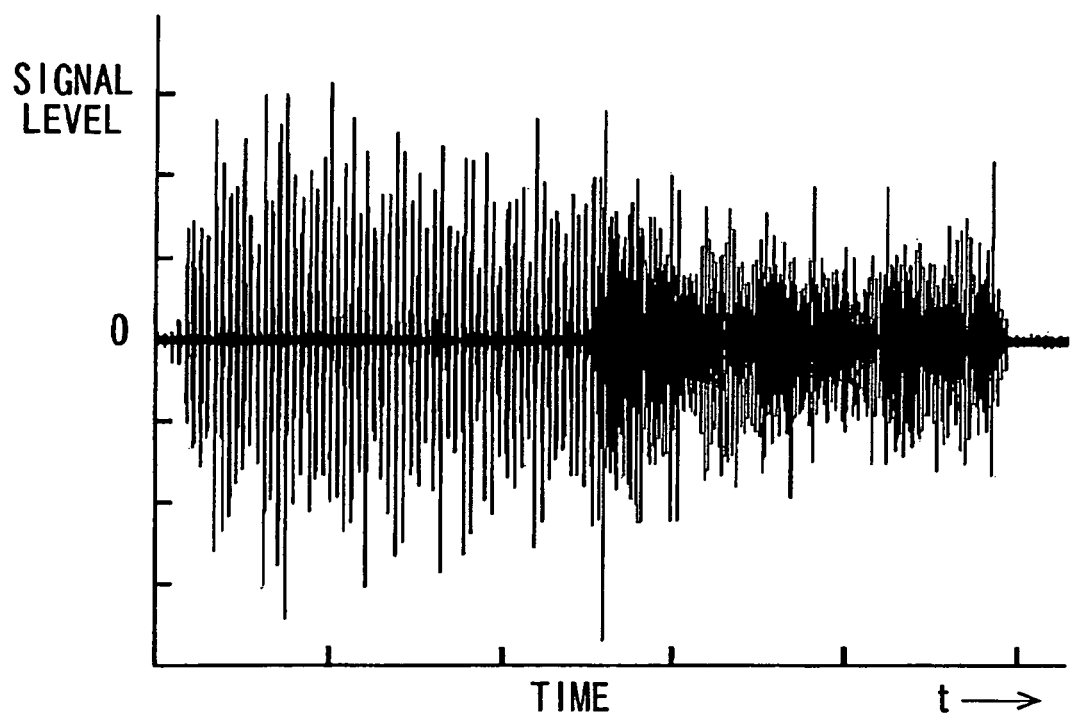
FIG. 15 is a diagram showing audio signals.
Figure 16:
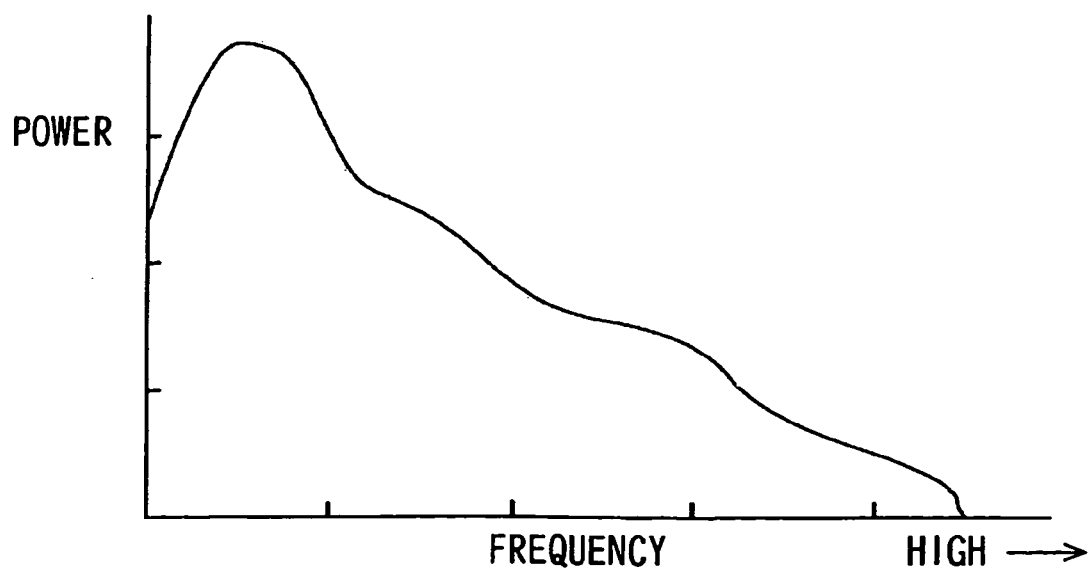
FIG. 16 is a graph showing a Fourier transformed result of the audio signals.

A Fourier transform unit 341 performs Fourier transform on the audio signals 221 for the set time to detect power for each frequency. An example of the Fourier transformed result of the audio signals 221 shown in FIG. 15 is shown in FIG. 16.

Figure 17:
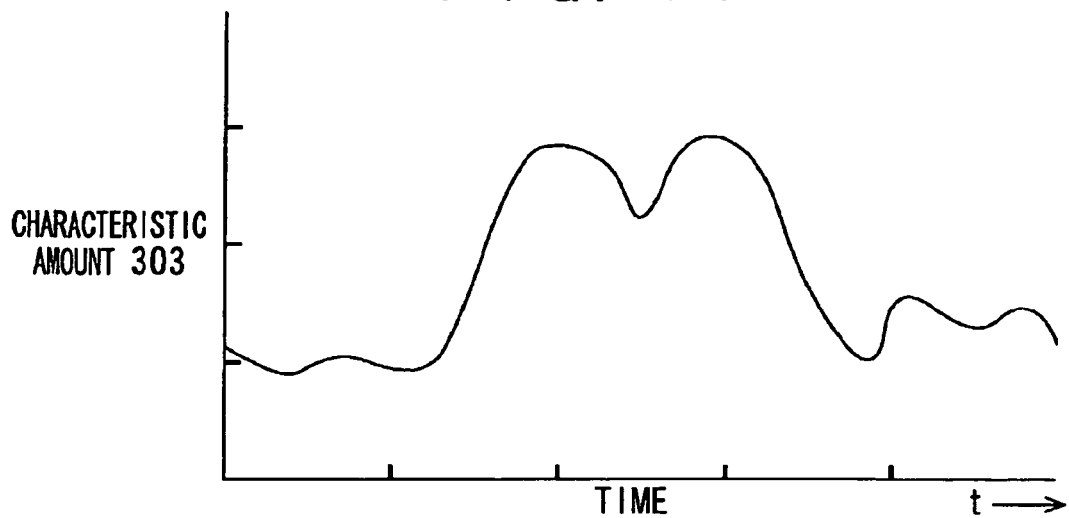
FIG. 17 is a graph showing a change in characteristic amount 303.

A center-of-gravity calculation unit 342 calculates an average obtained by weighting power PWi to frequency fi, that is, the center of gravity CA. When the frequency range in determining the center of gravity CA is "f0 to fg", the center of gravity CA is calculated based on following Formula (5). The calculated center of gravity CA is set as the characteristic amount CVc303. FIG. 17 shows a change in the characteristic amount 303.

$$CA = \sum_{i=0}^{g} fi \cdot PWi/g \tag{5}$$

Figure 18:
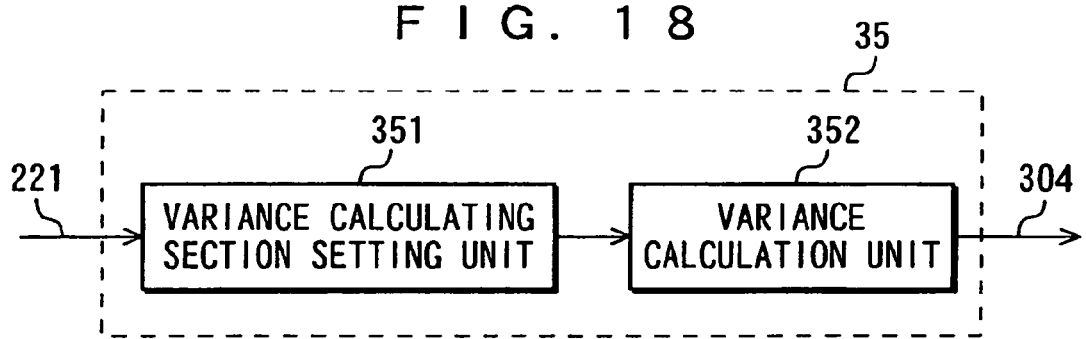
FIG. 18 is a diagram showing a configuration of a volume detection unit.
Figure 19:
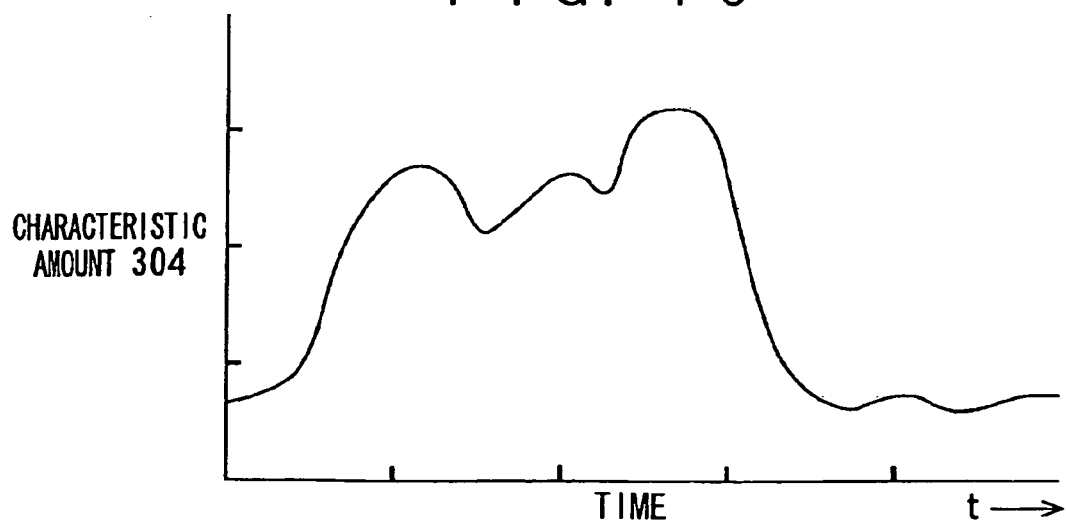
FIG. 19 is a graph showing a change in characteristic amount 304.

FIG. 18 shows an example of configuration of the volume detection unit 35. This volume detection unit 35 includes a variance calculating section setting unit 351 and a variance calculation unit 352, for example, as shown in FIG. 18. The volume detection unit 35 uses the audio signals 221 supplied via the filter unit 33 to calculate variance of sound levels in a predetermined section, e.g., for one frame period. The variance is calculated in the same manner as Formula (4). The calculated variance is set as the characteristic amount 304 showing a volume. In addition, the variance is calculated according to same way as the one performed in the movement average calculation with sequentially moving one-frame periods using the audio signals. FIG. 19 shows a change in the characteristic amount 304.

Figure 20:
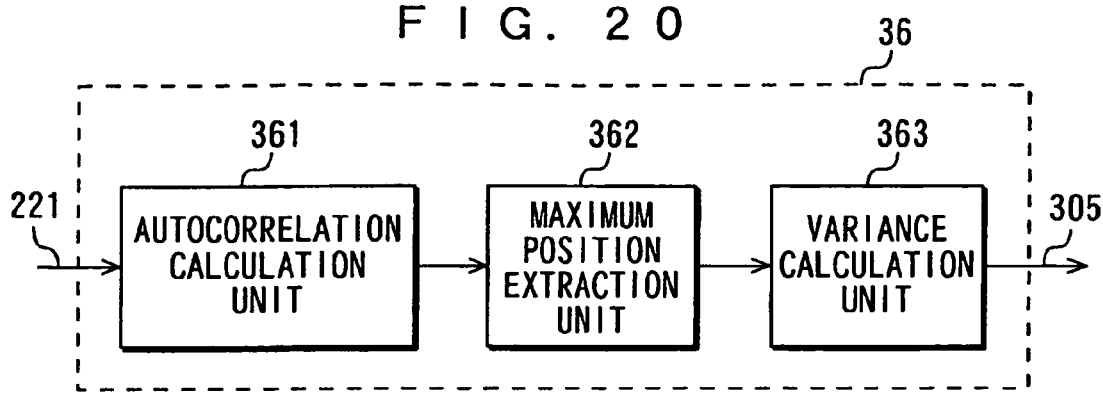
FIG. 20 is a diagram showing a configuration of a voice periodicity detection unit.

As in the case of the image, the sound periodicity detection unit 36 calculates a variance of the autocorrelation maximum position, which is set as the characteristic amount 305. FIG. 20 shows a configuration of the sound periodicity detection unit 36.

An autocorrelation calculation unit 361 calculates autocorrelation coefficient RA based on following Formula (6) from signal level aj of the audio signals 221 supplied via the filter unit 33 using the audio signals 221, e.g., for a predetermined section thereof. The predetermined section is set to be longer than the period of sound to be detected as in the calculation of the autocorrelation coefficient RV.

$$RA = \frac{\sum_{j=0}^{r-1-s} aj \cdot a(j+s)}{\sqrt{\sum_{j=0}^{r-1-s} aj^2} \sqrt{\sum_{j=0}^{r-1-s} a(j+s)^2}} \quad (6)$$

Figure 21:
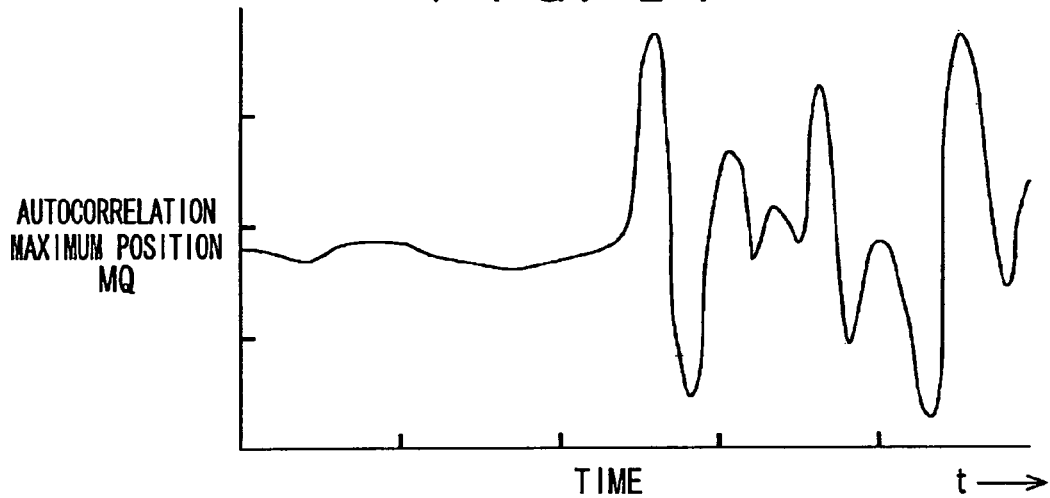
FIG. 21 is a graph showing a change in autocorrelation maximum position.

A maximum position extraction unit 362 extracts a maximum position from the calculated autocorrelation coefficient RA for each time range set according to an audience state to be detected. Thus, the maximum position of the autocorrelation coefficient RA is extracted so that the autocorrelation maximum position MQ can be illustratively shown in FIG. 21.

Figure 22:
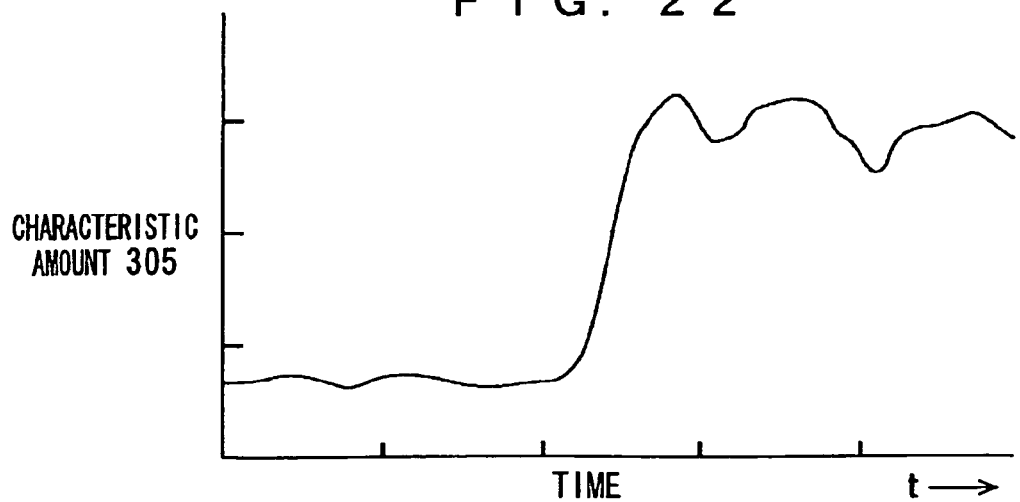
FIG. 22 is a graph showing the change in characteristic amount 305.

A variance calculation unit 363 calculates variance of the autocorrelation maximum position MQ. The variance of the autocorrelation maximum position can be calculated by performing the same arithmetic processing as that of Formula (4). The calculated variance is set as the characteristic amount 305. FIG. 22 shows a change in the characteristic amount 305.

In the sound periodicity detection unit 36, the variance of the autocorrelation maximum position of sound is set as the characteristic amount 305. When the characteristic amount 305 is large, the periodic fluctuation is large. When the characteristic amount 305 is small, the periodic fluctuation is small. The characteristic amount 305 may show the fluctuation state of a sound signal period. For example, the standard deviation of the autocorrelation maximum position can also be used.

The integration estimation unit 40 estimates the state of the audience 60 using plural characteristic amounts detected in the characteristic amount detection unit 30. FIGS. 23A to 23C show the cases wherein the state of the audience 60 is estimated using the characteristic amounts 301, 302, 303, 304 and 305 detected in the characteristic amount detection unit 30. When the characteristic amount 301 showing a magnitude of movement and the characteristic amount 303 showing the center of gravity of the power spectrum are larger than a reference level, any one of states of "beating time with the hands" and of "clapping" is estimated. When they are not larger than the reference level, any one of states of "laughing" and "other movement" is estimated. The reference level is set according to each of the characteristic amounts, which is the same for the following.

Figure 24A:
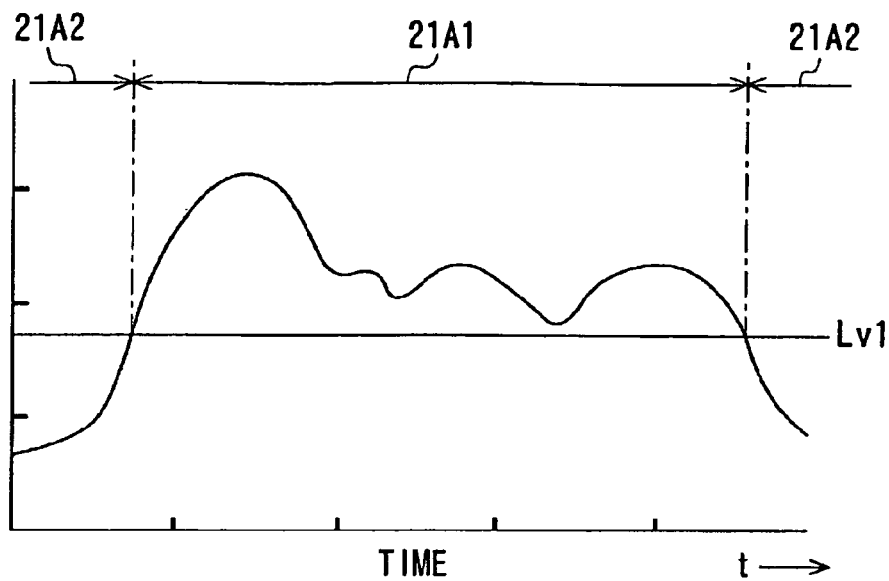
FIGS. 24A, 24B are graphs each showing an estimated result (part 1) based on the characteristic amount.

As shown in FIG. 24A, when the characteristic amount 301 is larger than reference level Lv1, any one 21A1 of states of "beating time with the hands" and of "clapping" is estimated. When it is not larger than the reference level Lv1, any one 21A2 of states of "laughing" and of "other movement" is estimated.

Figure 24B:
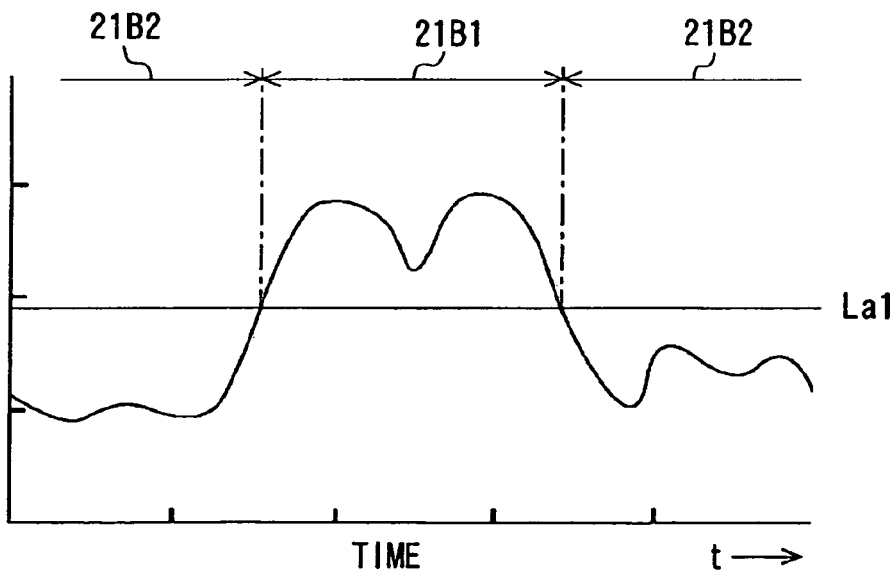

As shown in FIG. 24B, when the characteristic amount 303 is larger than reference level La1, any one 21B1 of states of "beating time with the hands" and of "clapping" is estimated. When it is not larger than the reference level La1, any one 21B2 of states of "laughing" and of "other movement" is estimated.

Figure 25A:
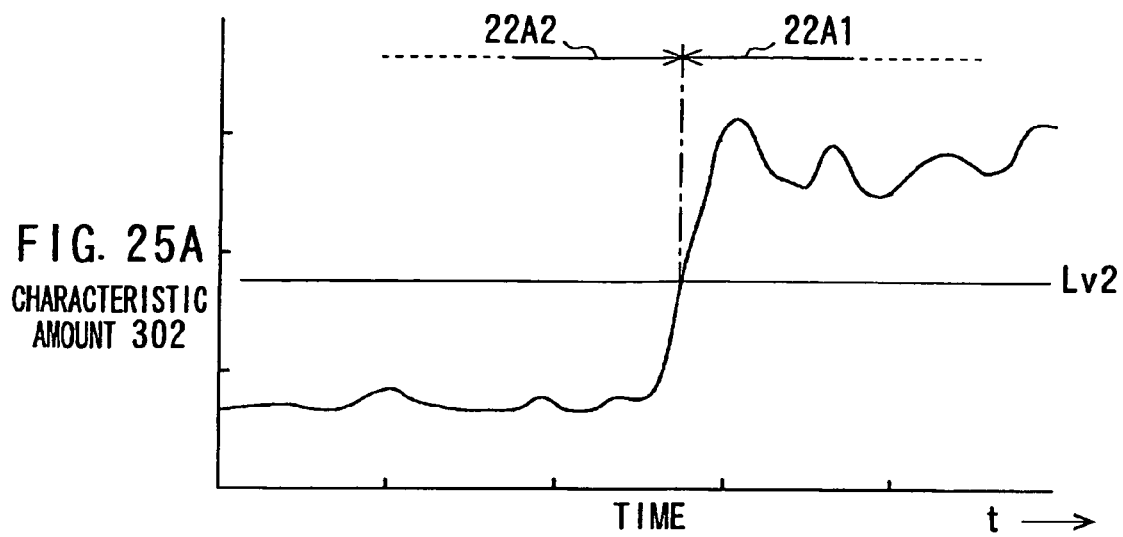
FIGS. 25A to 25C are graphs each showing the estimated result (part 2) based on the characteristic amount.
Figure 25B:
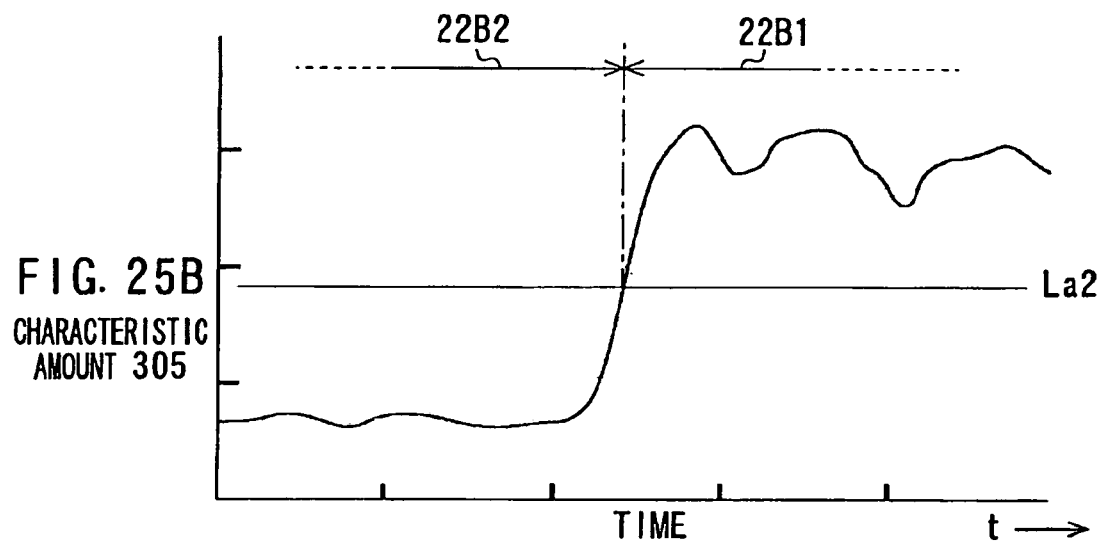

When the characteristic amount 302 showing periodicity of movement and the characteristic amount 305 showing periodicity of sound are larger than a reference level, states 22A1, 22B1 of "clapping" are estimated as shown in FIGS. 25A, 25B. When they are not larger than the reference level, states 22A2, 22B2 of "beating time with the hands" are estimated.

As shown in FIG. 25A, when the characteristic amount 302 is larger than reference level Lv2, the state 22A1 of "clapping" is estimated. When it is not larger than the reference level Lv2, the state 22A2 of "beating time with the hands" is estimated. As shown in FIG. 25B, when the characteristic amount 305 is larger than reference level La2, the state 22B1 of "clapping" is estimated. When it is not larger than the reference level La2, the state 22B2 of "beating time with the hands" is estimated.

Figure 25C:
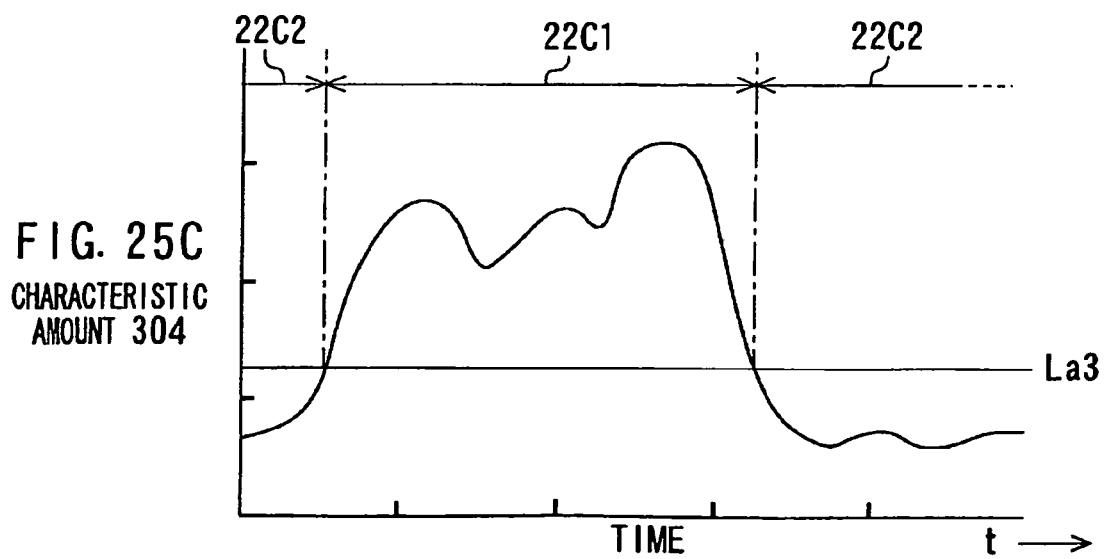

When the characteristic amount 304 showing periodicity of sound including voice is larger than a reference level, the state of "laughing" is estimated. When it is not larger than the reference level, the state of "other movement" is estimated. As shown in FIG. 25C, when the characteristic amount 304 is larger than reference level La3, state 22C1 of "laughing" is estimated. When it is not larger than the reference level La3, state 22C2 of "other movement" is estimated.

With AND or OR of the estimated result of the characteristic amount 302 showing periodicity of movement and the estimated result of the characteristic amount 305 showing periodicity of sound, for example, the "clapping" may be logic "0" and the "beating time with the hands" may be logic "1", for performing a logic operation so that the operated result may be a final estimated result. In this case, when the estimated result based on periodicity of movement and the estimated result based on periodicity of sound may be different, one estimated result can be obtained.

The characteristic amounts used for estimating the state of the audience 60 may be selected and used according to the contents provision state. When the movement of the audience 60 can be preferably obtained and sound including voice is difficult to obtain, the characteristic amounts showing a magnitude and periodicity of movement are mainly used to estimate an audience state. When the movement of the audience 60 is difficult to obtain and sound including voice can be preferably obtained, the characteristic amounts showing a volume and periodicity of sound are mainly used to estimate an audience state. As shown in FIG. 26, in a concert, as indicated by ◯, the characteristic amounts 301, 305 and 304 respectively showing a magnitude of movement, periodicity of sound and a volume of sound are used. In a dark movie theater, the characteristic amounts 303, 305 and 304 respectively showing a power spectrum, periodicity of sound and a volume of sound are used. In a sports relay whose periodicity of sound is less than that of the concert, the characteristic amounts 301, 302 and 304 respectively showing a magnitude of movement, periodicity of movement and a volume of sound are used. The characteristic amounts used for estimating the audience state are selected according to a contents provision state to estimate the audience state more properly.

Plural characteristic amounts may be integrated to compare the integrated result with a threshold value for estimating the audience state. For example, magnitudes of movement and volumes of sound are averaged to calculate an average. The average is compared with the threshold value to perform audience state estimation. Alternately, a magnitude of movement and a volume of sound are weighted according to the contents provision state, and then, the average of the weighted characteristic amounts can be used to perform audience state estimation. An added value and a linear sum of the characteristic amounts, that is, an added value of the weighted characteristic amounts may be calculated to perform audience state estimation based on the compared result obtained by comparing the added value with the threshold value.

The output unit 50 displays the estimated result using a display device. When provided contents are contents written onto a recording medium or the provided contents are written onto the recording medium, the estimated result may be written together onto the recording medium A unit in which the audience is in a desired state can be easily searched for.

Without observing the audience by any person, based on the video signal 211 relative to an image showing the imaged audience 60 and the audio signal 221 generated by obtaining sound including voice from the audience 60, the movement, the volume of sound and the periodicity at the audience 60 can be discriminated to automatically estimate the state of the audience 60.

Figure 27:
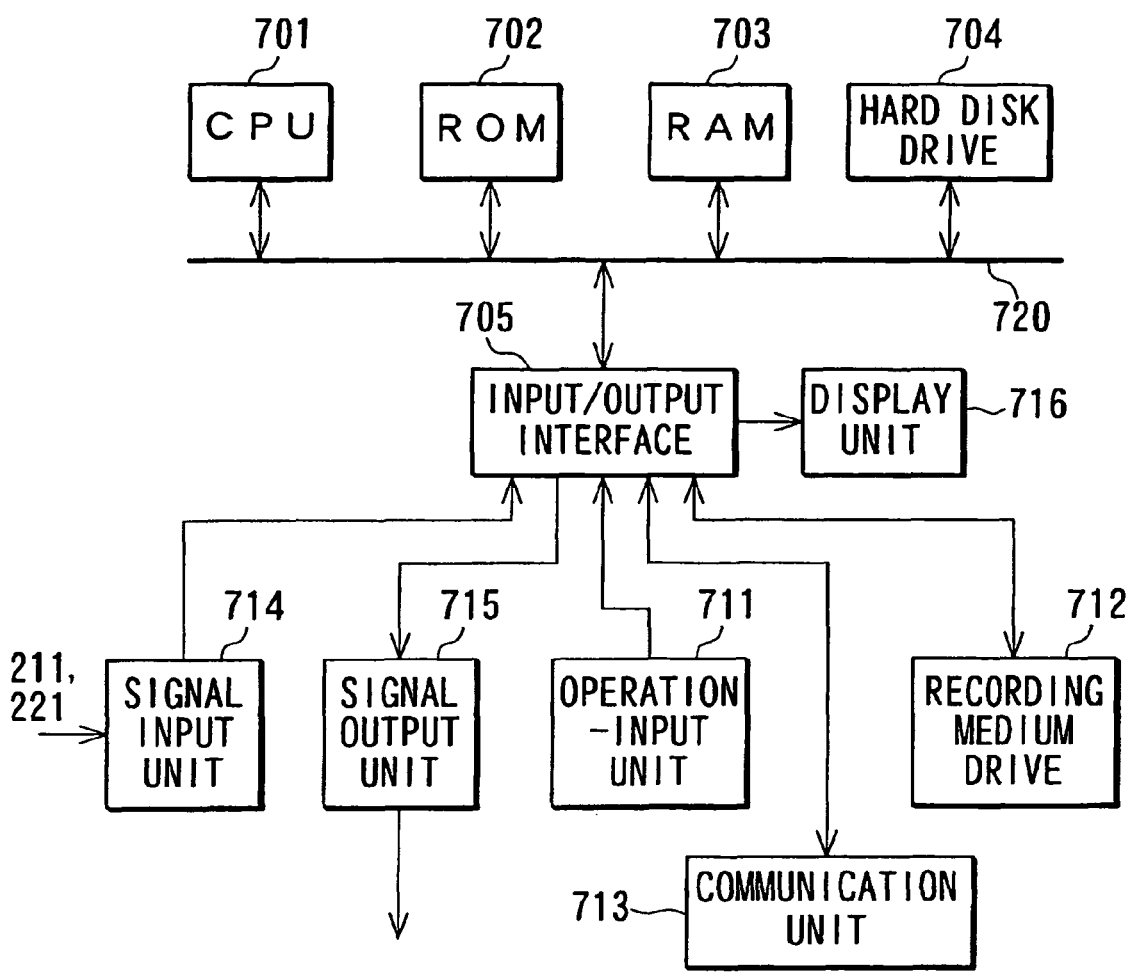
FIG. 27 is a diagram showing a configuration of an audience state estimation system using a computer.

The above audience state estimation may be realized, not only by hardware, but also by software. FIG. 27 shows a configuration in this case. The computer incorporates a CPU (Central Processing Unit) 701, as shown in FIG. 27. The CPU 701 is connected via a bus 720 to a ROM 702, a RAM 703, a hard disk drive 704, and an input/output interface 705. The input/output interface 705 is connected to an operation-input unit 711, a recording medium drive 712, a communication unit 713, a signal input unit 714, a signal output unit 715, and a display unit 716.

When a command is inputted from an external device or a command is inputted from the operation input unit 711 that is configured using operation device such as a keyboard or mouse and sound input means such as a microphone, the command is supplied via the input/output interface 705 to the CPU 701.

The CPU 701 executes a program stored in the ROM 702, the RAM 703, or the hard disk drive 704 to perform processing corresponding to the supplied command. An audience state estimation program for executing the estimation processing on the computer is previously stored in the ROM 702, the RAM 703, or the hard disk drive 704 to estimate an audience state based on a signal inputted into the signal input unit 714, outputting the estimated result from the signal output unit 715. The audience state estimation program may be also stored into a recording medium. The recording medium drive 712 may write the audience state estimation program onto the recording medium or read the audience state estimation program written onto the recording medium so as to execute it on the computer. The communication unit 713 may transmit or receive the audience state estimation program via a wire or wireless transmission path. The received audience state estimation program may be executed on the computer.

The audience state estimation program will be described. FIG. 28 shows a flowchart showing the entire audience state estimation processing.

In step ST1, a video signal and an audio signal are fetched. For example, the video signal 211 and the audio signal 221 supplied to the signal input unit 714 are used to start estimation of an audience state.

In step ST2, the characteristic amounts are detected. FIG. 29 is a flowchart showing the detection operation of the characteristic amount 301. FIGS. 30 to 33 show the detection operations of the characteristic amounts 302, 303, 304 and 305, respectively.

In step ST11 of FIG. 29, a flesh-color area is extracted based on the video signal 211. In step ST12, a movement vector of the flesh-color area thus extracted in step ST11 is calculated for each of blocks. In step ST13, based on the movement vector for each of the blocks thus calculated in step ST12, the movement amounts of the blocks are averaged for each frame to calculate an average movement amount. The calculated average movement amount is set as the characteristic amount 301.

Figure 30:
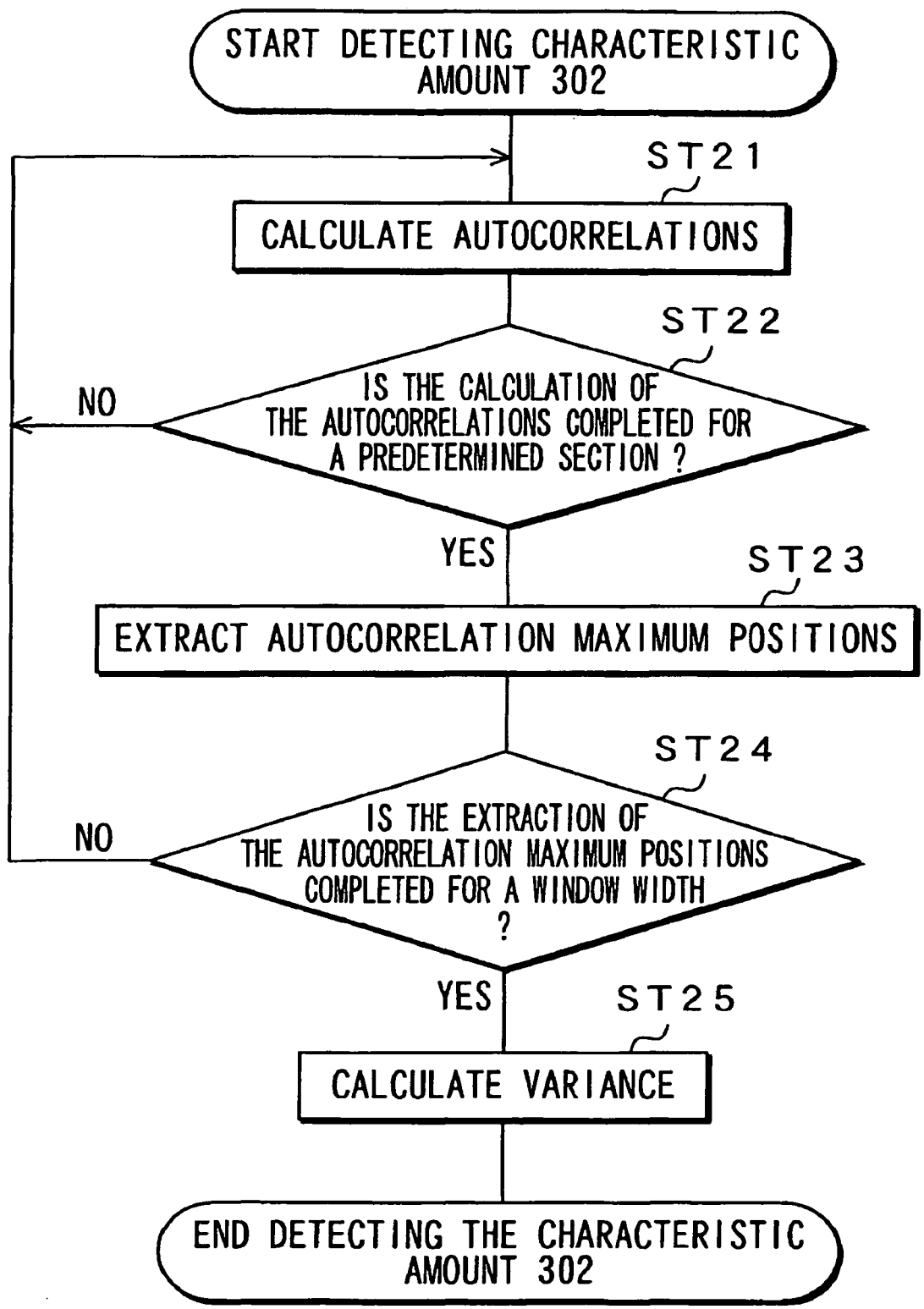
FIG. 30 is flow chart showing the detection processing for the characteristic amount 302.

In step ST21 of FIG. 30, the average movement amounts calculated in step ST13 are used to calculate autocorrelation coefficients. In step ST22, it is determined whether the calculation of the autocorrelation coefficients for a predetermined section (to k frame) is completed. When it is not completed, the routine is returned to step ST21. When it is completed, the routine is advanced to step ST23.

In step ST23, maximum positions from the autocorrelation coefficients for the predetermined section (hereinafter referred to "autocorrelation maximum position") are discriminated to advance to step ST24. In step ST24, it is determined whether extraction of the autocorrelation maximum positions is performed for a window width set according to periodicity of movement detected. When the extraction for the window width is not completed in step ST24, the routine is returned to step ST21. When the extraction is completed, the routine is advanced to step ST25.

In step ST25, the extracted autocorrelation maximum positions are used to calculate variance. The calculated variance is set as the characteristic amount 302.

Figure 31:
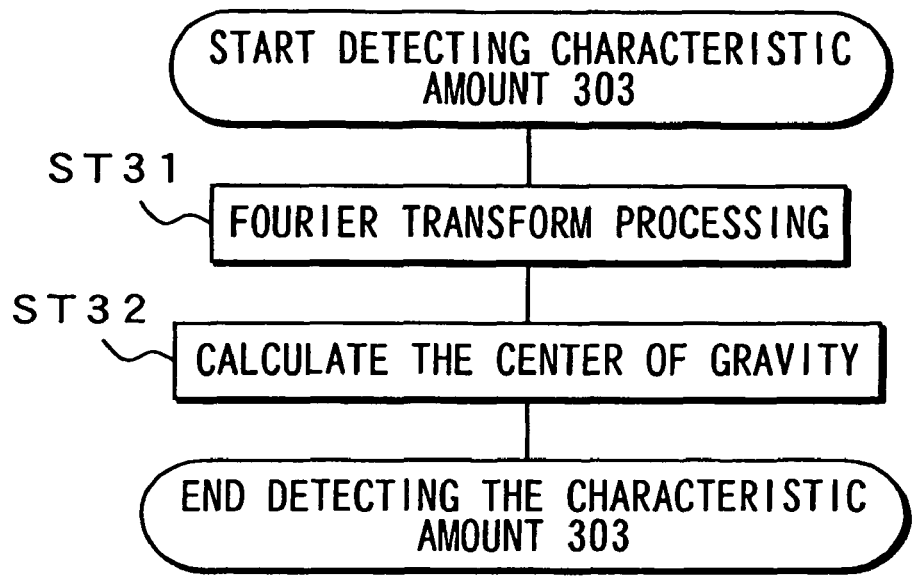
FIG. 31 is flow chart showing the detection processing for the characteristic amount 303.

In step ST31 of FIG. 31, the audio signals 221 for a time set according to an audience state to be detected are Fourier transformed, thereby detecting power for each frequency. In step ST32, an average obtained by weighting power to the frequency, that is, the center of gravity CA is determined. The center of gravity CA is set as the characteristic amount 303.

Figure 32:
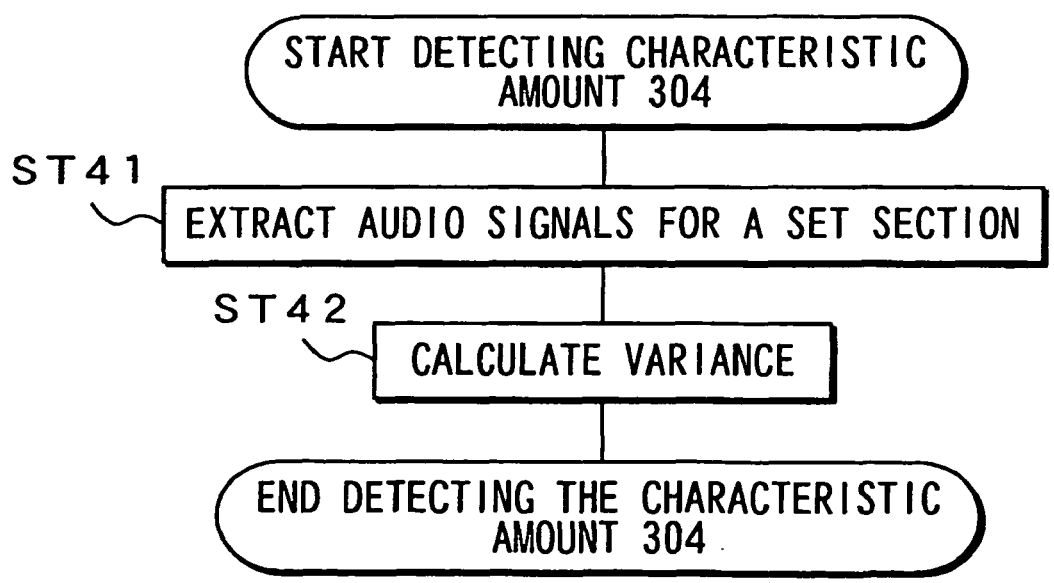
FIG. 32 is flow chart showing the detection processing for the characteristic amount 304.

In step ST41 of FIG. 32, the audio signals 221 for a predetermined section, e.g., for a frame, are extracted and the routine is advance to step ST42. In step ST42, variance of the extracted audio signal 221 is calculated. The variance is set as the characteristic amount 304.

Figure 33:
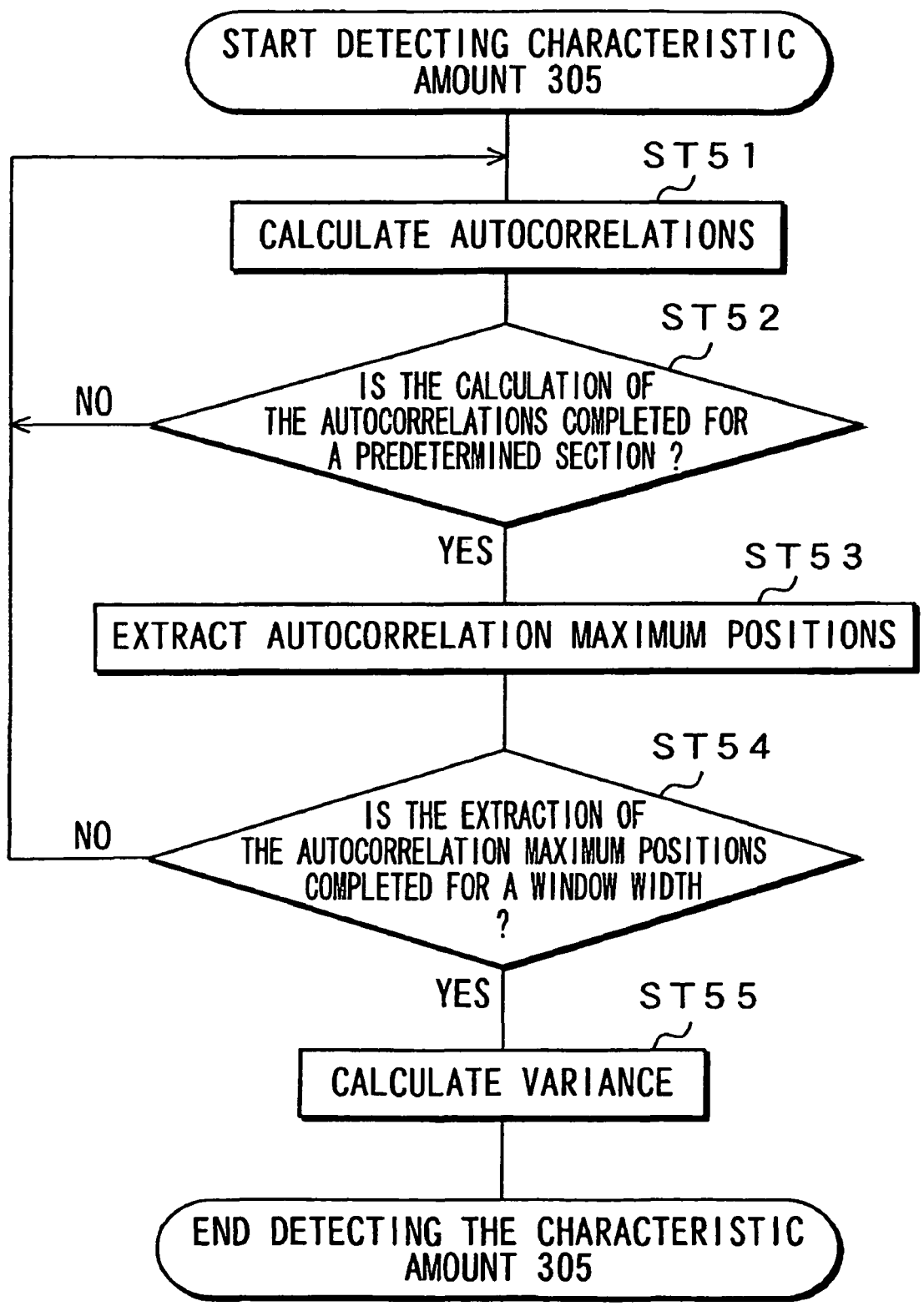
FIG. 33 is flow chart showing the detection processing for the characteristic amount 305.

In step ST51 of FIG. 33, autocorrelation coefficients of the signal levels of the audio signals 221 are calculated. In step ST52, it is determined whether the calculation of the autocorrelations is completed for a predetermined section. When it is not completed, the routine is returned to step ST51. When it is completed, the routine is advanced to step ST53.

In step ST53, maximum positions from the autocorrelation coefficients for the predetermined section are discriminated and the routine is advanced to step ST54. In step ST54, it is determined whether extraction of the autocorrelation maximum positions is performed for a window width set according to periodicity of sound detected. When the extraction for the window width is not completed in step ST54, the routine is returned to step ST51. When the extraction is completed, the routine is advanced to step ST55.

In step ST55, the extracted autocorrelation maximum positions are used to calculate variance. The calculated variance is set as the characteristic amount 305.

Thus, the movement amount, the periodicity of movement, the volume and the periodicity of sound, and the center of gravity of the power spectrum are respectively detected as the characteristic amounts. In step ST3 of FIG. 28, an audience state is estimated based on the plural characteristic amounts detected in step ST2.

Figure 34:
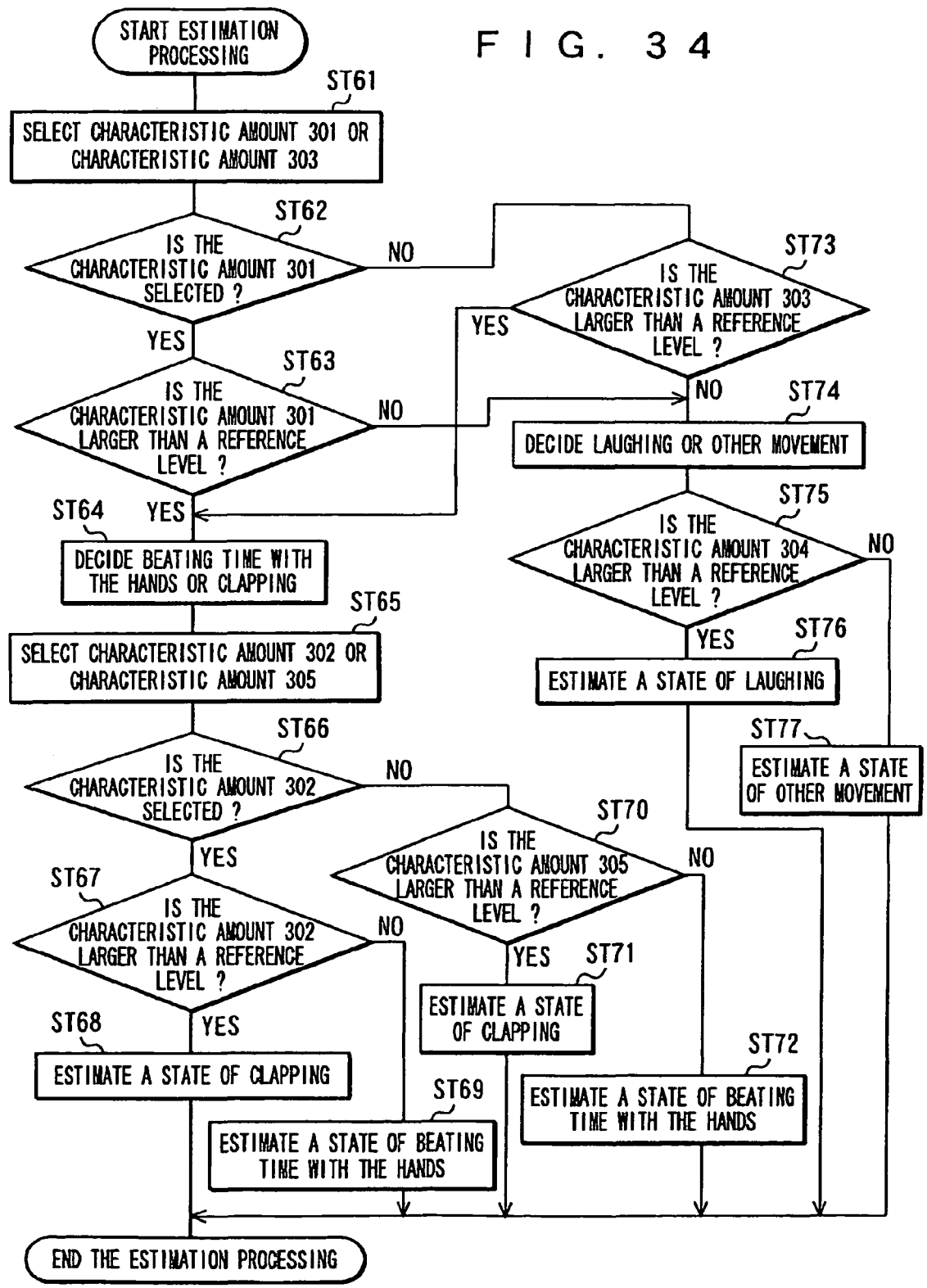
FIG. 34 is flow chart showing audience state estimation processing.

FIG. 34 is flow chart showing audience state estimation processing.

In step ST61, any one of the characteristic amount 301 showing an average movement amount and the characteristic amount 303 showing the center of gravity of a power spectrum is selected and the routine is advanced to step ST62.

In step ST62, it is determined whether the characteristic amount 301 is selected in step ST61. When the characteristic amount 301 is selected, the routine is advanced to step ST63. When the characteristic amount 303 is selected, the routine is advanced to step ST73.

In step ST63, it is determined whether the characteristic amount 301 is larger than the reference level Lv1. When the characteristic amount 301 is larger than the reference level Lv1, the routine is advanced to step ST64. When it is not larger than the reference level Lv1, the routine is advanced to step ST74.

In step ST64, it is estimated that the audience state is in any one of states of "beating time with the hands" and of "clapping" and the routine is advanced to step ST65.

In step ST65, any one of the characteristic amounts 302 and 305 is selected and the routine is advanced to step ST66. In step ST66, when the characteristic amount 302 is selected in step ST65, the routine is advanced to ST67. When the characteristic amount 305 is selected, the routine is advanced to ST70.

In step ST67, it is determined whether the characteristic amount 302 is larger than the reference level Lv2. When the characteristic amount 302 is larger than the reference level Lv2, the routine is advanced to step ST68 wherein the audience state is estimated to be in the state of "clapping". When the characteristic amount 302 is not larger than the reference level Lv2, the routine is advanced to step ST69 wherein the audience state is estimated to be in the state of "beating time with the hands".

The characteristic amount 305 is selected in step ST65 and the routine is advanced from step ST66 to step ST70. In step ST70, it is determined whether the characteristic amount 305 is larger than the reference level La2. When the characteristic amount 305 is larger than the reference level La2, the routine is advanced to step ST71 wherein the audience state is estimated to be in the state of "clapping". When the characteristic amount CVe305 is not larger than the reference level La2, the routine is advanced to step ST72 wherein the audience state is estimated to be in the state of "beating time with the hands".

The characteristic amount 303 is selected in step ST61 and the routine is advanced from step ST62 to step ST73. In step ST73, it is determined whether the characteristic amount 303 is larger than the reference level La1. When the characteristic amount 303 is larger than the reference level La1, the routine is advanced to step ST64. When the characteristic amount 303 is not larger than the reference level La1, the routine is advanced to step ST74.

When the routine is advanced from step ST63 or step ST73 to step ST74, it is estimated that the audience state is in any one of states of "laughing" and of "other movement" in step ST74, and the routine is advanced to step ST75.

In step ST75, it is determined whether the characteristic amount 304 is larger than the reference level La3. When the characteristic amount 304 is larger than the reference level La3, the routine is advanced to step ST76 wherein the audience state is estimated to be in the state of "laughing". When the characteristic amount 304 is not larger than the reference level La3, the routine is advanced to step ST77 wherein the audience state is estimated to be in the state of "other movement".

When the audience state is thus estimated, in step ST4 of FIG. 28, an estimated result signal showing the estimated result is outputted from the signal output unit 715. Alternately, the estimated result is displayed on the display unit 716. When contents are written onto a recording medium and the contents are read to output a video signal and an audio signal of the contents from the signal output unit 715, the reading position of the contents may be associated with the estimated result for writing them onto the recording medium or storing them into the storage device. This can easily check the relation between the contents and the audience state.

Thus, the audience state estimation program is executed to estimate the audience state based on the software.

In the above embodiment, the characteristic amount 301 showing a magnitude of movement, the characteristic amount 302 showing periodicity of movement, the characteristic amount 303 showing the center of gravity of a power spectrum, the characteristic amount 304 showing a volume of sound, and the characteristic amount 305 showing periodicity of sound are used to estimate the state of the audience 60. The characteristic amounts are not limited to these.

Figure 35:
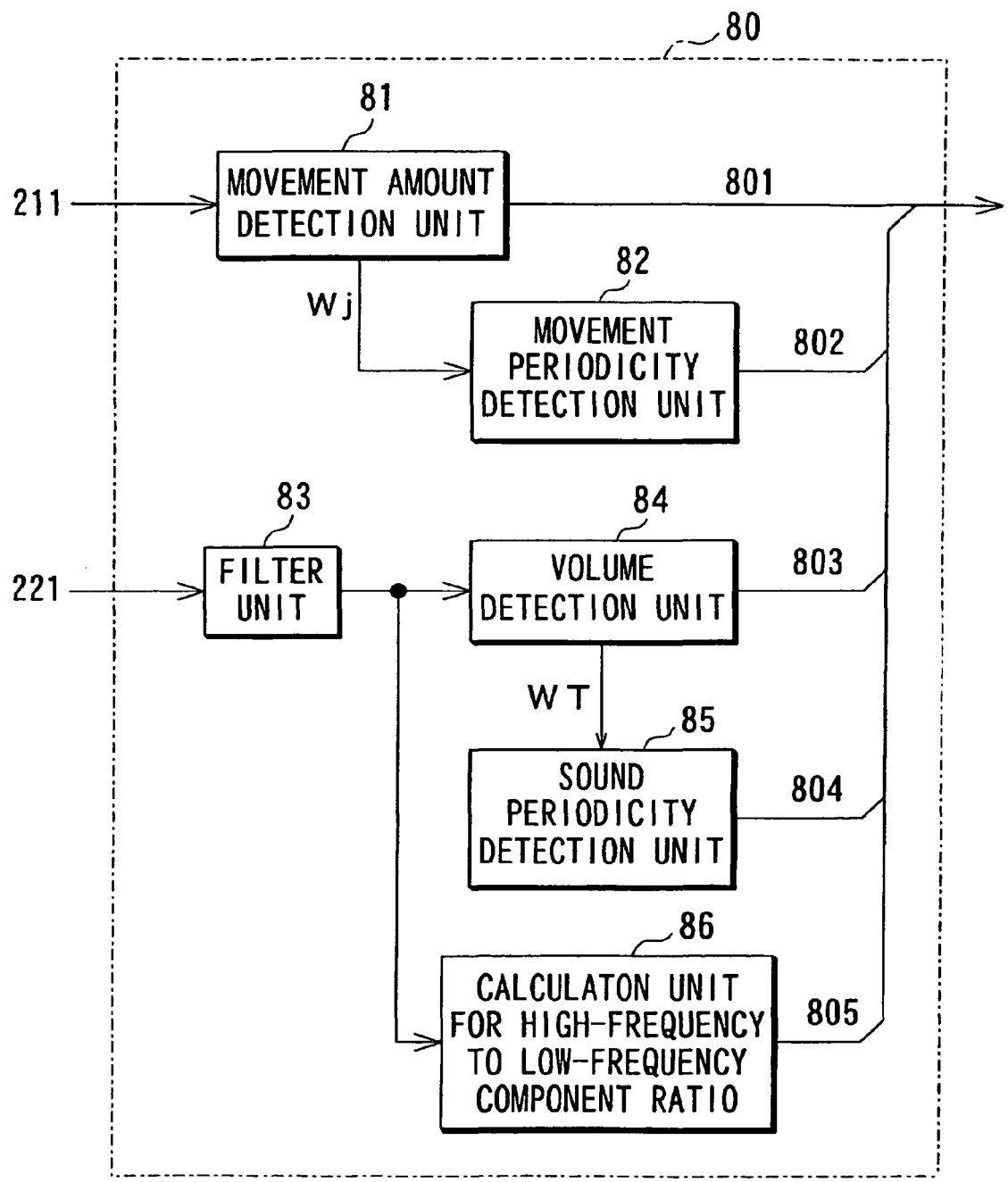
FIG. 35 is a diagram showing a configuration of another characteristic amount detection unit.

FIG. 35 shows a configuration of another characteristic amount detection unit 80. The characteristic amount detection unit 80 detects the characteristic amounts about a movement amount, periodicity of movement within a fixed time, and a volume, periodicity of sound including voice and a frequency component of the sound within the fixed time at the audience 60 side. As in the characteristic amount detection unit 30, the movement amount and volume are detected based on the movement amount and volume within a fixed period using video signals for each frame and audio signals for each period corresponding to the one frame. A low-frequency component is detected by band limitation by a low-pass filter and Fourier transform, and then, the periodicity of movement and sound are detected based on the detected low-frequency component. The characteristic amount about the frequency component of sound is detected using the Fourier transformed result of the sound level.

A movement amount detection unit 81 of the characteristic amount detection unit 80 detects an average movement amount. A movement periodicity detection unit 82 detects movement periodicity based on the frequency component of movement. A volume detection unit 84 detects a volume. A sound periodicity detection unit 85 detects sound periodicity based on the frequency component of sound. A calculation unit 86 for a high-frequency to low-frequency component ratio calculates a high-frequency to low-frequency component ratio of sound as the characteristic amount about the frequency component of sound.

FIG. 36 shows a configuration of the movement amount detection unit 81. Units corresponding to the movement amount detection unit 31 shown in FIG. 5 are indicated by the same reference numerals. The flesh-color area extraction unit 311 extracts the flesh-color area. The movement vector calculation unit 312 calculates a movement vector of the flesh-color area. The average movement amount calculation unit 313 calculates an average of magnitudes of the movement vectors for each frame based on Formula (2), which is average movement amount Wj. The calculated average movement amount Wj is supplied to a time average calculation unit 811 and a movement periodicity detection unit 82.

Figure 37A:
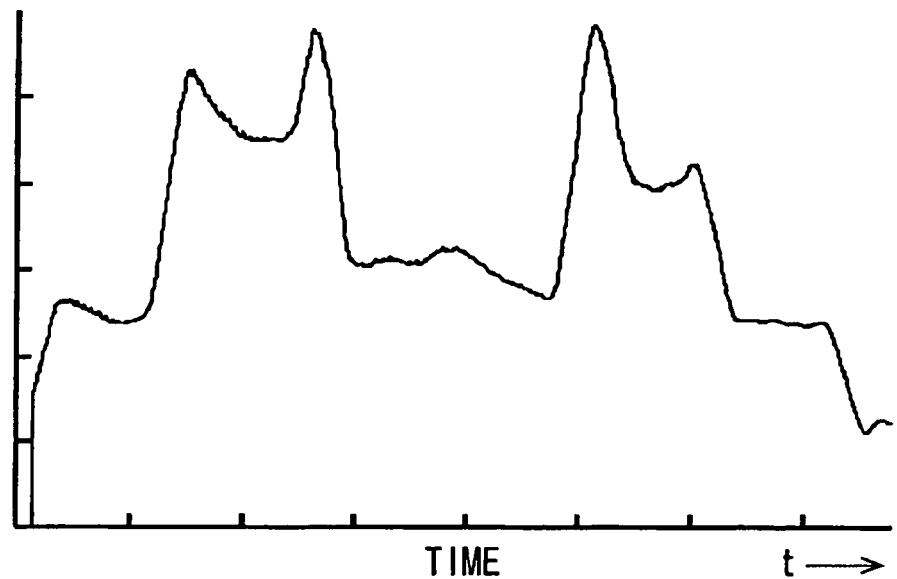
FIGS. 37A, 37B are graphs each showing a change in characteristic amount 801.
Figure 37B:
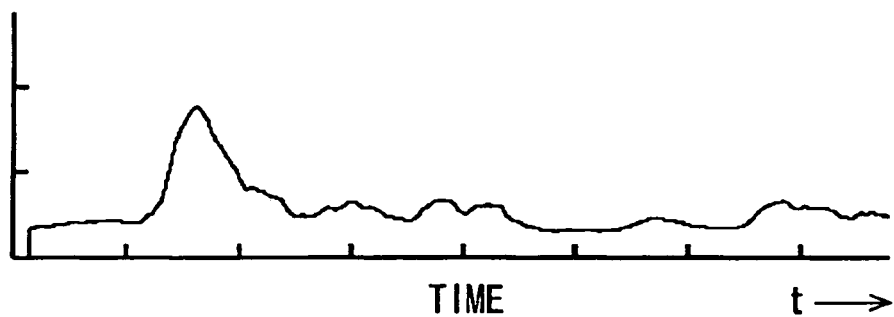

The time average calculation unit 811 averages the average movement amounts Wj in the time direction to calculate time macro movement amount WU. The time macro movement amount WU is calculated according to the same way as one used for calculating the movement average and weighting movement average. When the time macro movement amount WU is illustratively calculated using the average movement amounts Wj for n+1 frame, time macro movement amount WUa is calculated using the average movement amounts from a frame to (a+n) frame. Time macro movement amount WU (a+1) is then calculated using the average movement amounts Wj from (a+1) frame to (a+n+1) frame. In the same manner, the time macro movement amounts WU are successively calculated with the frame positions being sequentially moved. The time macro movement amounts are set as characteristic amount 801. Alternatively, when calculating the weighting movement average, the average movement amounts of the frames are weighted to be averaged, thereby calculating the time macro movement amount. The time macro movement amount is calculated with the frame positions being sequentially moved. The calculated time macro movement amount is also set as the characteristic amount 801. The number of frames averaged in calculating the time macro movement amount is set according to an audience state to be estimated. When estimating the states of "beating time with the hands", "clapping", "laughing" and the like, the time macro movement amount WU is calculated using the average movement amounts Wj for a frame for about one to two seconds. FIGS. 37A and 37B show a change in the characteristic amount 801 as the time macro movement amount WU in the time direction.

FIG. 38 shows an example of configuration of the movement periodicity detection unit 82. This movement periodicity detection unit 82 includes a threshold value setting unit 821, a low-frequency component detection unit 822, and a component ratio calculation unit 823, for example, as shown in FIG. 38. The movement periodicity detection unit 82 performs Fourier transform on the average movement amounts showing an average of magnitudes of the movement vectors, that is, the average movement amounts Wj in a window width set according to periodicity of movement to be detected. Based on the Fourier transformed result, that is, based on a ratio of the low-frequency component of the average movement amount Wj, the ratio of the power of the low-frequency component to all powers is calculated. The range of the low-frequency component is set according to periodicity of a state to be detected. Namely, when the frequency of the state to be detected is "fa" and the frequency of another state is "fb", a threshold value is set between the frequency "fa" and the frequency "fb" and a component below the threshold value is set as the low-frequency component. When the low-frequency component is large, it is estimated to be in the state to be detected. When the low-frequency component is small, it is estimated to be in another state.

For example, if a frequency of beating time with the hands is about 2 Hz and a frequency of clapping is about 5H, a window width is set so as to include the period of the two states and the threshold value is set between 2 Hz and 5 Hz, thereby deciding a low-frequency component. A ratio EVa of low-frequency component is calculated, and is set as characteristic amount 802. Calculating the ratio EVa of low-frequency component except for a DC component allows the periodicity to be made clearer.

The movement periodicity detection unit 82 also uses the low-pass filter to extract a low-frequency component from the time macro movement amount WU and determines the ratio of the low-frequency component to the time macro movement amount WU before band limitation by the low-pass filter as a ratio of low-frequency component. The ratio of low-frequency component may also be the characteristic amount 802. When a band-pass filter is used to remove a DC component, the periodicity can be detected at higher accuracy.

Figure 39A:
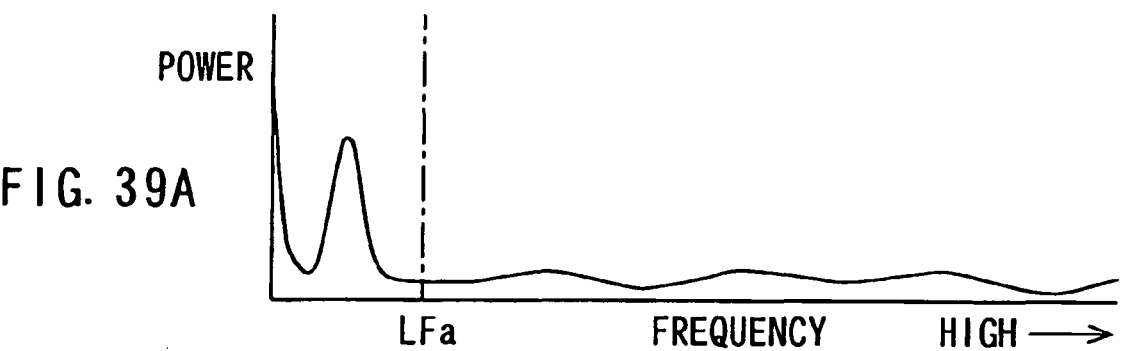
FIGS. 39A, 39B are graphs each showing a Fourier transformed result of average movement amount.
Figure 39B:
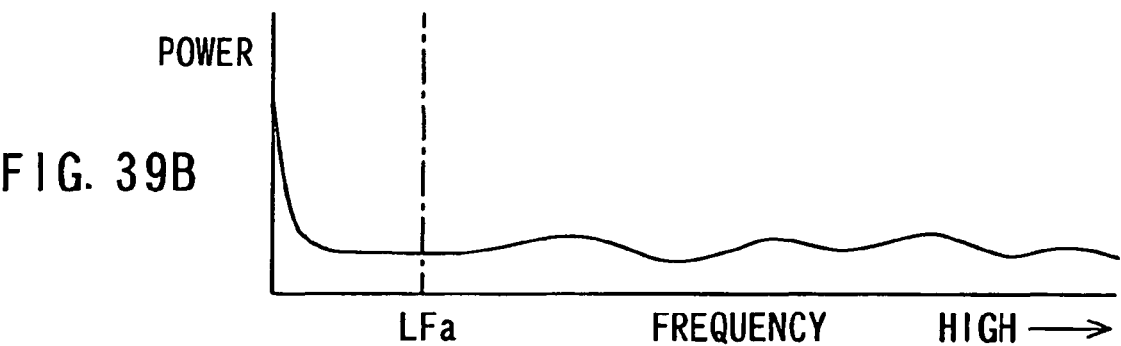
Figure 40:
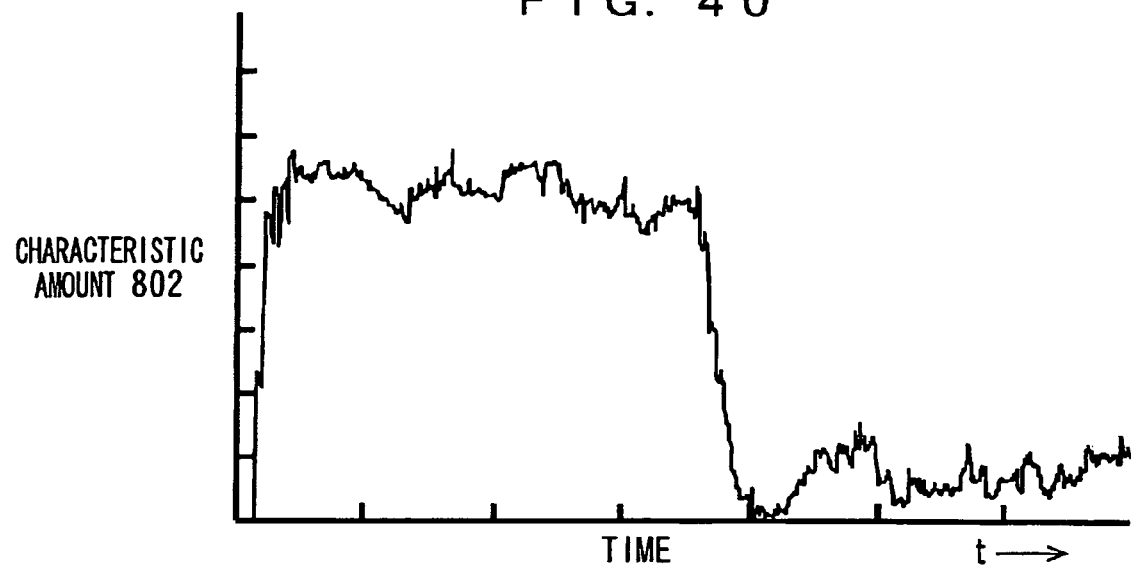
FIG. 40 is a graph showing a change in characteristic amount 802.

FIG. 39A shows a Fourier transformed result in a low-frequency state. FIG. 39B shows a Fourier transformed result not in the low-frequency state. When a threshold value is set to frequency LFa, whether the frequency is low can be discriminated based on the ratio EVa of low-frequency component. FIG. 40 shows a change in the characteristic amount 802.

Figure 42A:
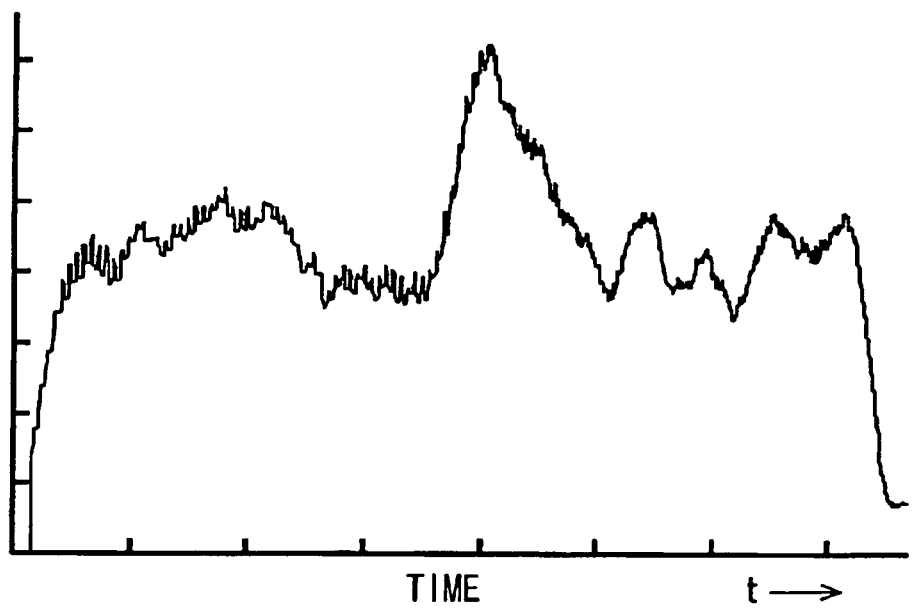
FIGS. 42A, 42B are graphs each showing a change in characteristic amount 803.
Figure 42B:
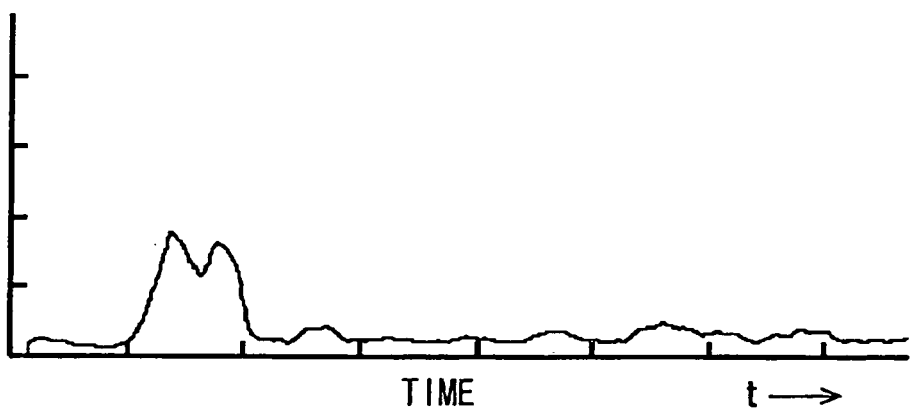

FIG. 41 shows a configuration of the volume detection unit 84. A variance calculation unit 841 of the volume detection unit 84 calculates variance of sound levels in a predetermined section, e.g., for each frame, as in the volume detection unit 35. A time average calculation unit 842 performs the same processing as that of calculation of the time macro movement amount WU in the time average calculation unit 811. The time average calculation unit 842 also sequentially uses the variance in the predetermined section, e.g., for each frame, for each predetermined section according to an audience state to be estimated to calculate a movement average or a weighting movement average as time macro volume WT. The time macro volume WT is set as the characteristic amount 803. FIGS. 42A and 42B show changes in the characteristic amount 803.

Thus, by averaging the variance of the sound levels calculated for each frame, when the sound level of a single frame is fluctuated by the viewing contents or environment, the stable and less-fluctuated characteristic amount can be obtained.

Figure 43:
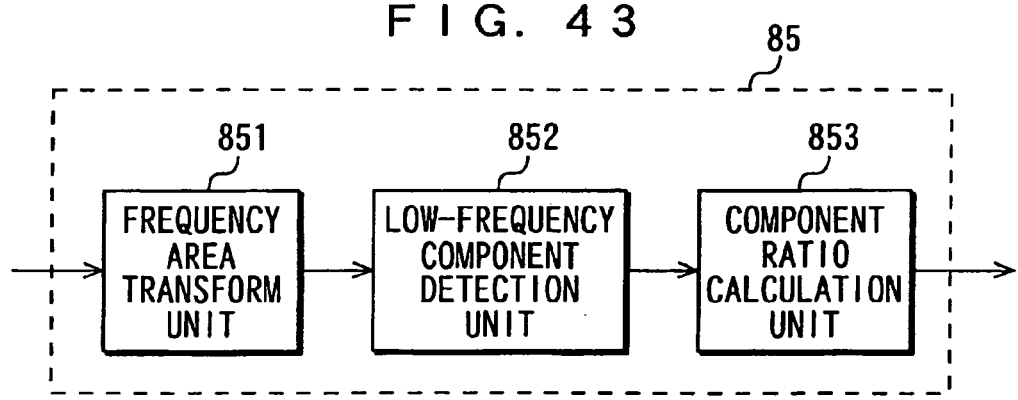
FIG. 43 is a diagram showing a configuration of a volume periodicity detection unit.

FIG. 43 shows an example of configuration of the sound periodicity detection unit 85. This sound periodicity detection unit 85 includes a frequency area transform unit 851, a low-frequency component detection unit 852, and a component ratio calculation unit 853, for example, as shown in FIG. 43. The sound periodicity detection unit 85 performs Fourier transform on the time macro volume WT calculated in the volume detection unit 84. Based on the Fourier transformed result, the ratio of the power of the low-frequency component to all powers is calculated. The range of the low-frequency component is set according to periodicity of sound to be detected, as in the periodicity of movement. When the low-frequency component is large, it is estimated to be in the state to be detected. When the low-frequency component is small, it is estimated to be in another state. The ratio of low-frequency component that is calculated in the sound periodicity detection unit 85 is set as characteristic amount 804.

Figure 44:
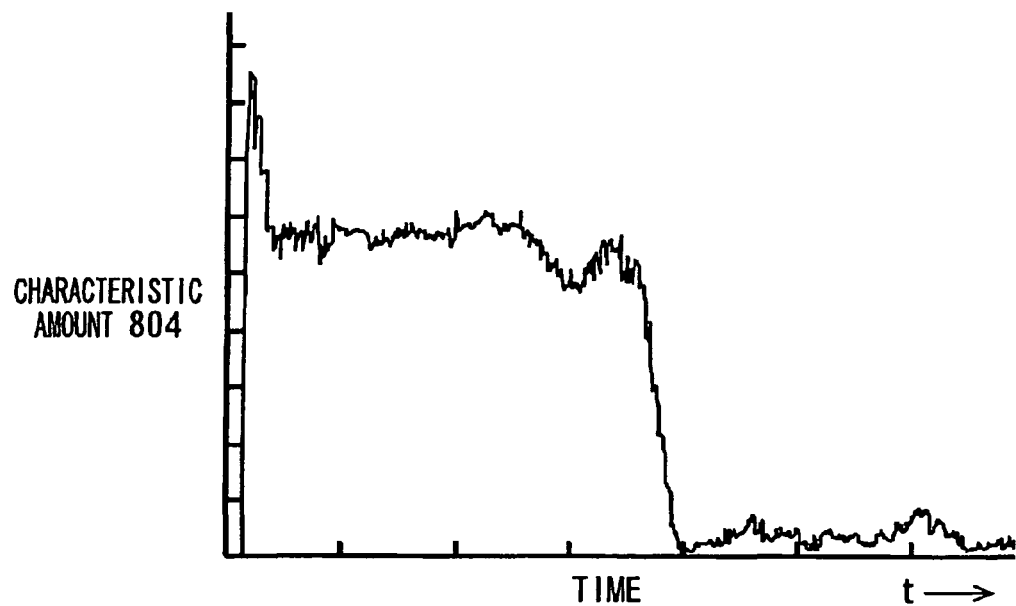
FIG. 44 is a graph showing a change in characteristic amount 804.

The sound periodicity detection unit 85 extracts a low-frequency component from the time macro volume WT using the low-pass filter. The sound periodicity detection unit 85 also determines the ratio of the low-frequency component to the time macro volume WT before band limitation by the low-pass filter as a ratio of low-frequency component. The ratio of low-frequency component may also be the characteristic amount 804. FIG. 44 shows a change in the characteristic amount 804. When a band-pass filter is used to remove a DC component, the periodicity can be detected at higher accuracy.

Figure 45:
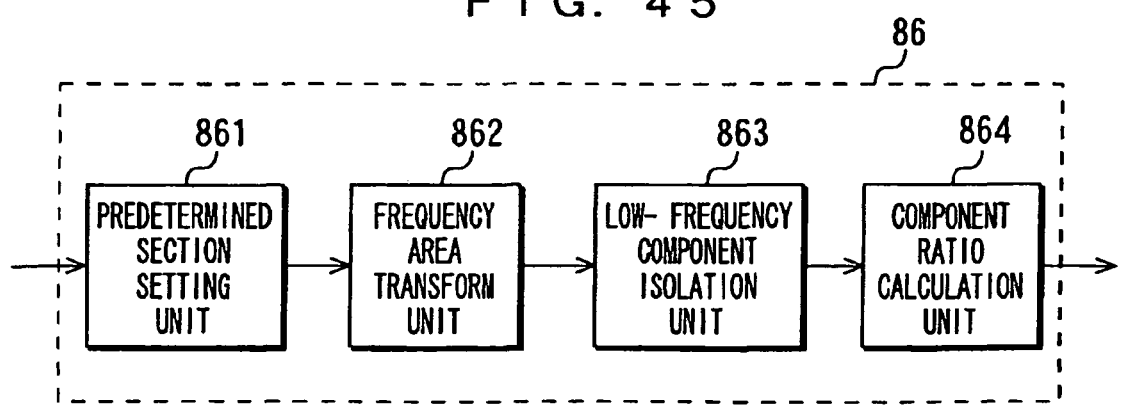
FIG. 45 is a diagram showing a configuration of a calculation unit for a high-frequency to low-frequency component ratio.

FIG. 45 shows an example of configuration of the calculation unit 86 for a high-frequency to low-frequency component ratio. This calculation unit 86 includes a predetermined section setting unit 861, a frequency area transform unit 862, a low-frequency component isolation unit 863, and a component ratio calculation unit 864, for example, as shown in FIG. 45. The calculation unit 86 performs Fourier transform on the audio signals 221 supplied via a filter unit 83 for a predetermined section according to an audience state to be estimated. The calculation unit 86 sections the power for the predetermined section into a high-frequency component and a low-frequency component, thereby calculating the high-frequency to low-frequency component ratio. The high-frequency to low-frequency component ratio is set as the characteristic amount 805.

In sound including voice in the states of "clapping" and "laughing", the high-frequency component in the state of "clapping" is larger than that the one in the state of "laughing". Accordingly, an audience state can be estimated based on the high-frequency to low-frequency component ratio.

In calculation of the high-frequency to low-frequency component ratio, the high-frequency component is isolated from the audio signal 221 by a high-pass filter and the low-frequency component is isolated therefrom by the low-pass filter. The high-frequency to low-frequency component ratio can be calculated from the obtained high-frequency and low-frequency components.

FIG. 46 shows a change in the characteristic amount 805.

Figures 47A, 47B:
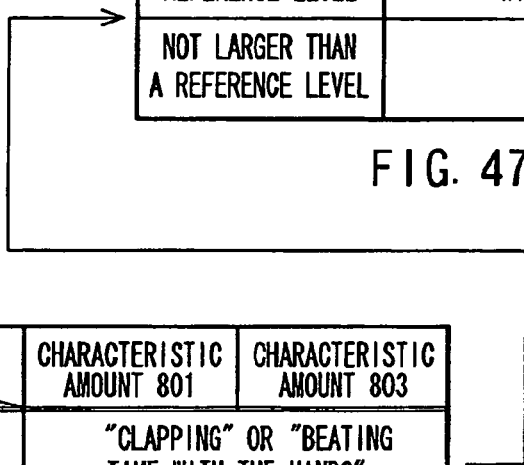
FIGS. 47A, 47B are diagrams each showing a table for estimation processing (not using the characteristic amount 805)

An estimation unit 90 (see FIG. 1) estimates the state of the audience 60 using the characteristic amounts 801, 802, 803, 804 and 805. FIGS. 47A, 47B show the estimation operation. When the characteristic amount 801 showing a magnitude of movement and the characteristic amount 803 showing a volume are larger than a first reference level, any one of states of "beating time with the hands" and of "clapping" is estimated. When it is not larger than a second reference level that is lower than the first reference level, the state of "other movement" is estimated. Within a range between the first and second reference levels, the state of "laughing" is estimated.

Figure 48A:
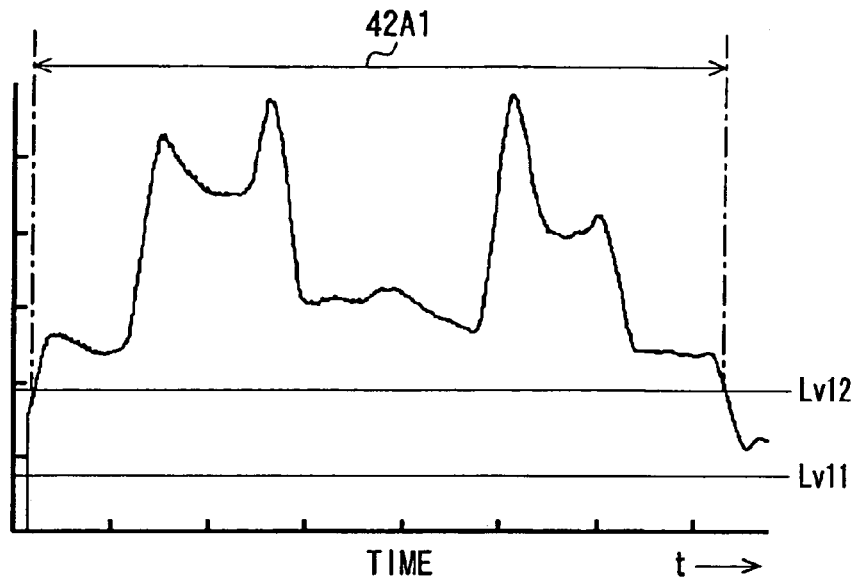
FIGS. 48A, 48B are graphs each showing the estimated result (part 3) based on the characteristic amount.
Figure 48B:
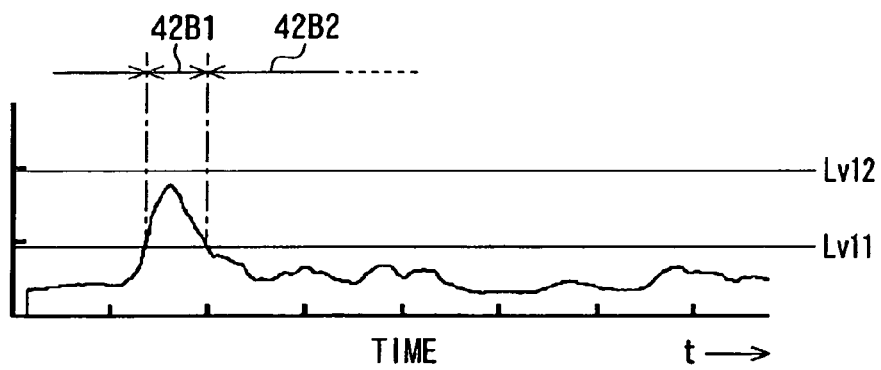

As shown in FIG. 48A, when the characteristic amount 801 is larger than reference level Lv12, any one 42A1 of states of "beating time with the hands" and of "clapping" is estimated. As shown in FIG. 48B, when the characteristic amount 801 is not larger than reference level Lv11, states 42B2 of "other movement" are estimated. Within a range between the reference levels Lv11 and Lv12, state 42B1 of "laughing" is estimated.

Figure 49A:
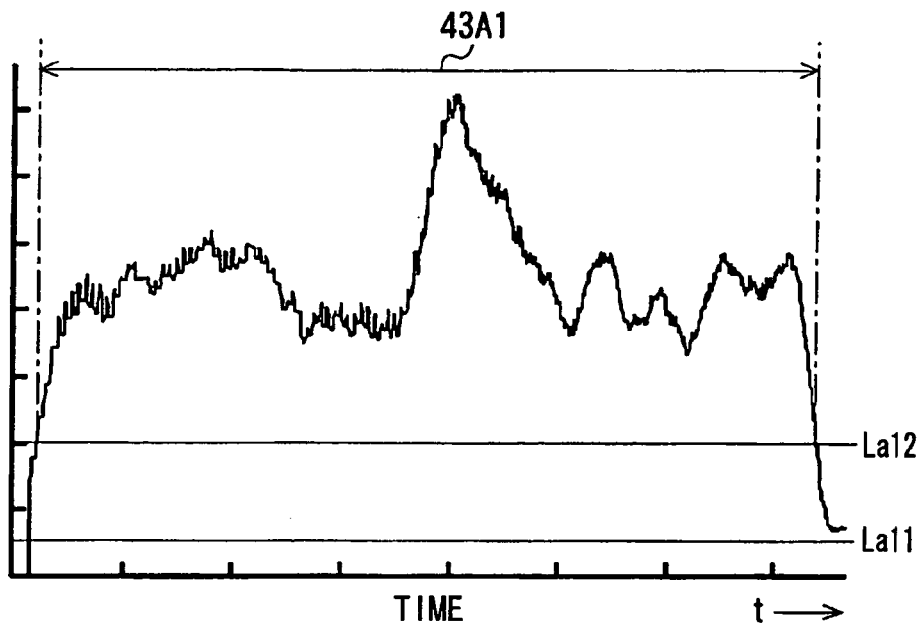
FIGS. 49A, 49B are graphs each showing the estimated result (part 4) based on the characteristic amount.
Figure 49B:
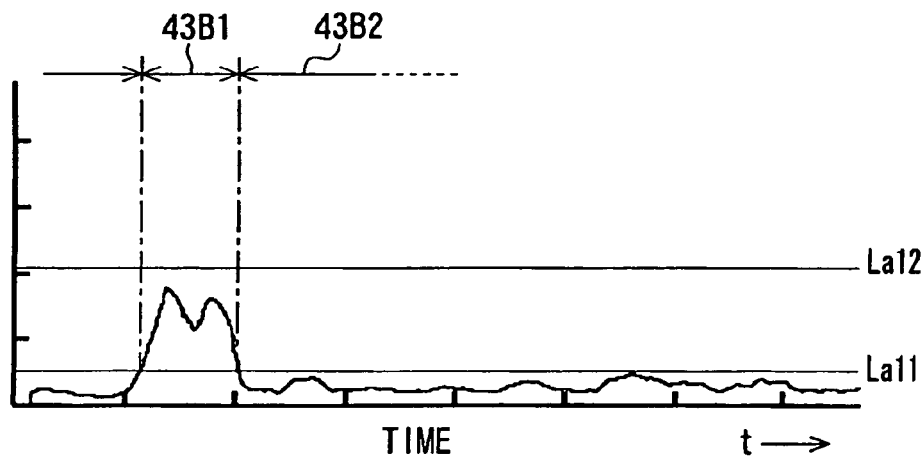

As shown in FIG. 49A, when the characteristic amount 803 is larger than reference level La12, any one 43A1 of states of "beating time with the hands" and "clapping" is estimated. As shown in FIG. 49B, when the characteristic amount 803 is not larger than reference level La11, states 43B2 of "other movement" are estimated. Within a range between the reference levels La11 and La12, state 43B1 of "laughing" is estimated.

When the characteristic amount 802 showing the ratio of low-frequency component of the average movement amount and the characteristic amount 804 showing the ratio of low-frequency component of the volume are larger than a reference level, the state of "beating time with the hands" is estimated. When it is not larger than the reference level, the state of "clapping" is estimated.

Figure 50A:
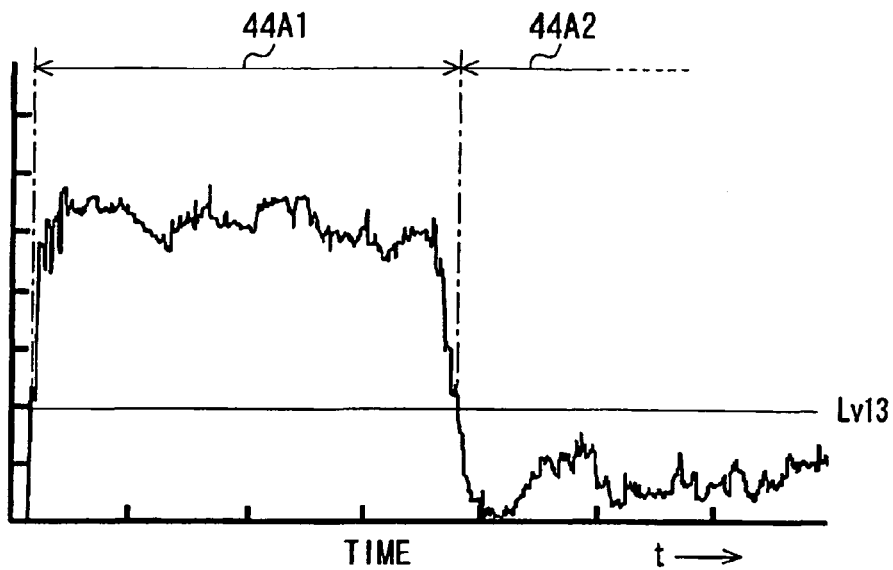
FIGS. 50A, 50B are graphs each showing the estimated result (part 5) based on the characteristic amount.
Figure 50B:
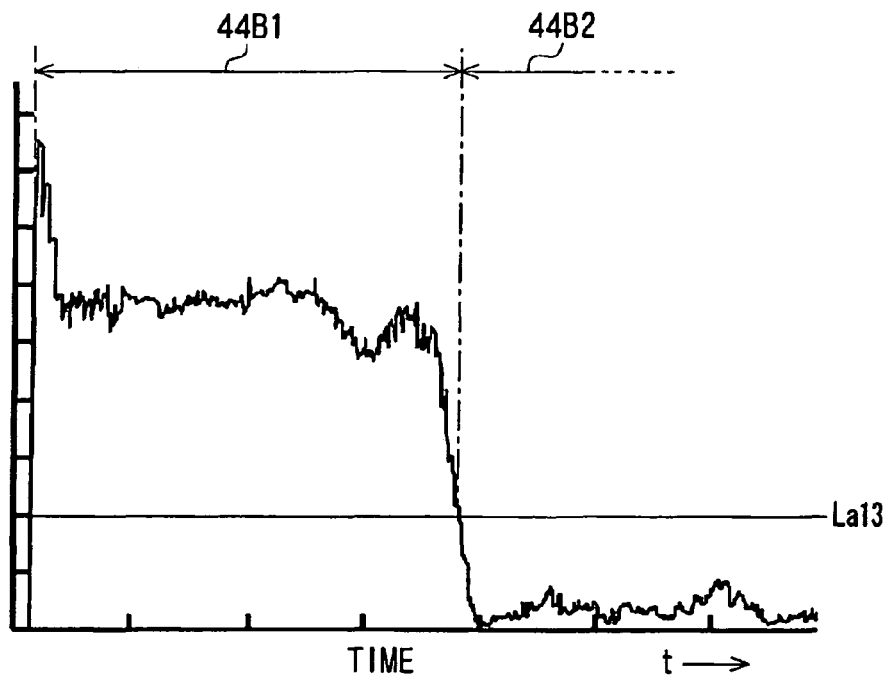

As shown in FIG. 50A, when the characteristic amount 802 is larger than reference level Lv13, state 44A1 of "beating time with the hands" is estimated. When it is not larger than the reference level Lv13, state 44A2 of "clapping" is estimated. As shown in FIG. 50B, when the characteristic amount 804 is larger than reference level La13, state 44B1 of "beating time with the hands" is estimated. When it is not larger than the reference level La13, state 44B2 of "clapping" is estimated.

Figures 51A, 51B, 51C:
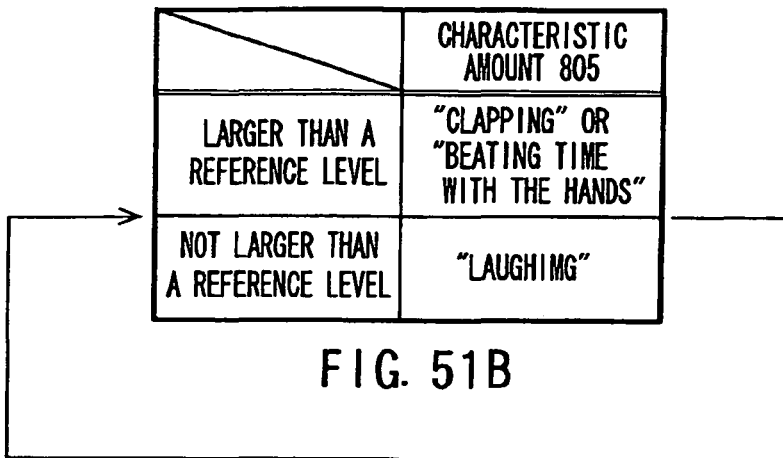
FIGS. 51A to 51C are diagrams each showing a table for estimation processing (using the characteristic amount 805)
Figure 52:
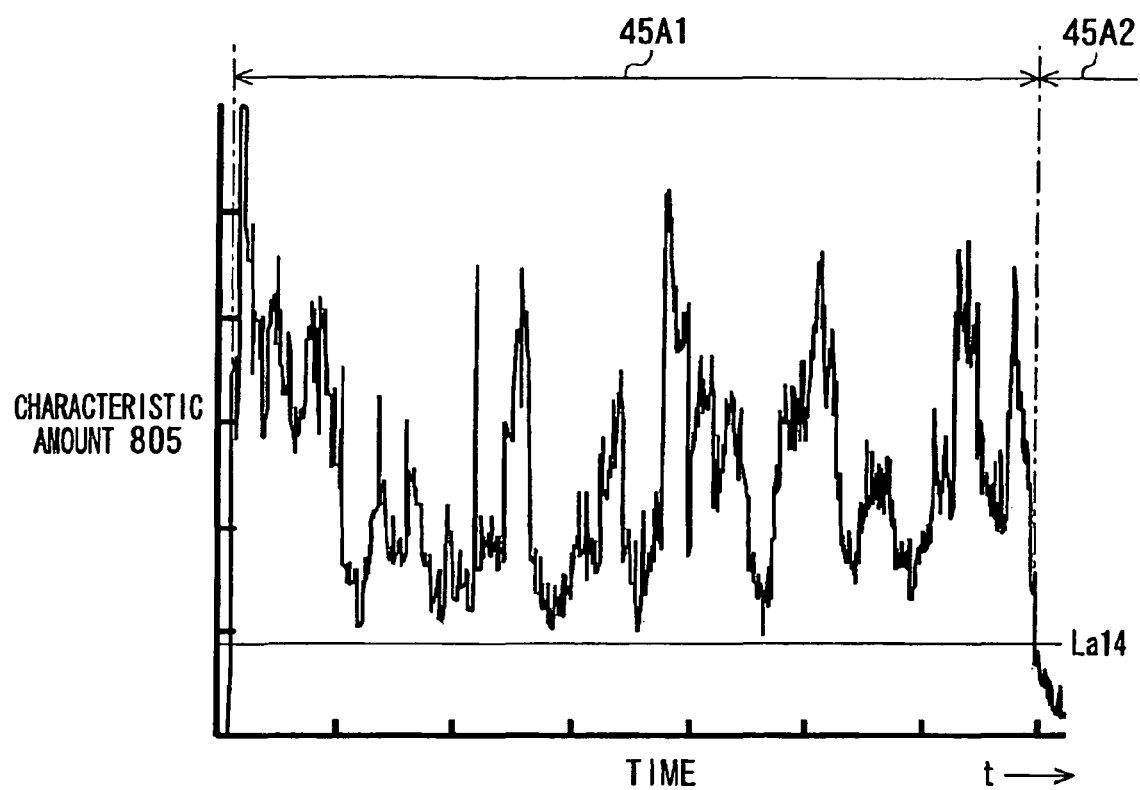
FIG. 52 is a graph showing the estimated result (part 6) based on the characteristic amount.

When using the characteristic amount 805 showing a high-frequency to low-frequency component ratio, the estimation operations shown in FIGS. 51A to 51C are performed. When the characteristic amount 801 showing a magnitude of movement and the characteristic amount 803 showing a volume are larger than a reference level, any one of states of "beating time with the hands", "clapping" and "laughing" is estimated. When the characteristic amount 803 is not larger than the reference level, the state of "other movement" is estimated. When the characteristic amount 805 showing a high-frequency to low-frequency component ratio of sound is larger than a reference level, any one of states 45A1 of "beating time with the hands" and "clapping" is estimated. When it is not larger than the reference level, the state of "laughing" is estimated. As shown in FIG. 52, when the characteristic amount 805 is larger than reference level La14, any one of states of "beating time with the hands" and "clapping" is estimated. When it is not larger than the reference level La14, the state 45A2 of "laughing" is estimated.

When the characteristic amount 802 showing a ratio of low-frequency component of movement and the characteristic amount 804 showing a ratio of low-frequency component of sound are larger than a reference level, the state 45A1 of "beating time with the hands" is estimated. When they are not larger than the reference level, the state 45A1 of "clapping" is estimated. When the characteristic amount 804 showing periodicity of sound is larger than a reference level, the state 45A2 of "laughing" is estimated. When it is not larger than the reference level, the state of "other movement" is estimated.

As described above, the logic operation of the estimated result of the characteristic amount 802 showing a ratio of low-frequency component of movement and the characteristic amount 804 showing a ratio of low-frequency component of sound is performed so that the operated result may be a final estimated result. The characteristic amounts used for estimating the state of the audience 60 may be selected according to the contents provision condition.

The audience state estimation program when detecting the characteristic amounts based on the frequency components of the movement and sound will be described. In the processing of this case, the detection of the characteristic amounts shown in step ST3 and estimation shown in step ST4 of FIG. 28 are different. Since other processing is the same, only the processing of detection of the characteristic amounts and estimation will be described.

Figure 53:
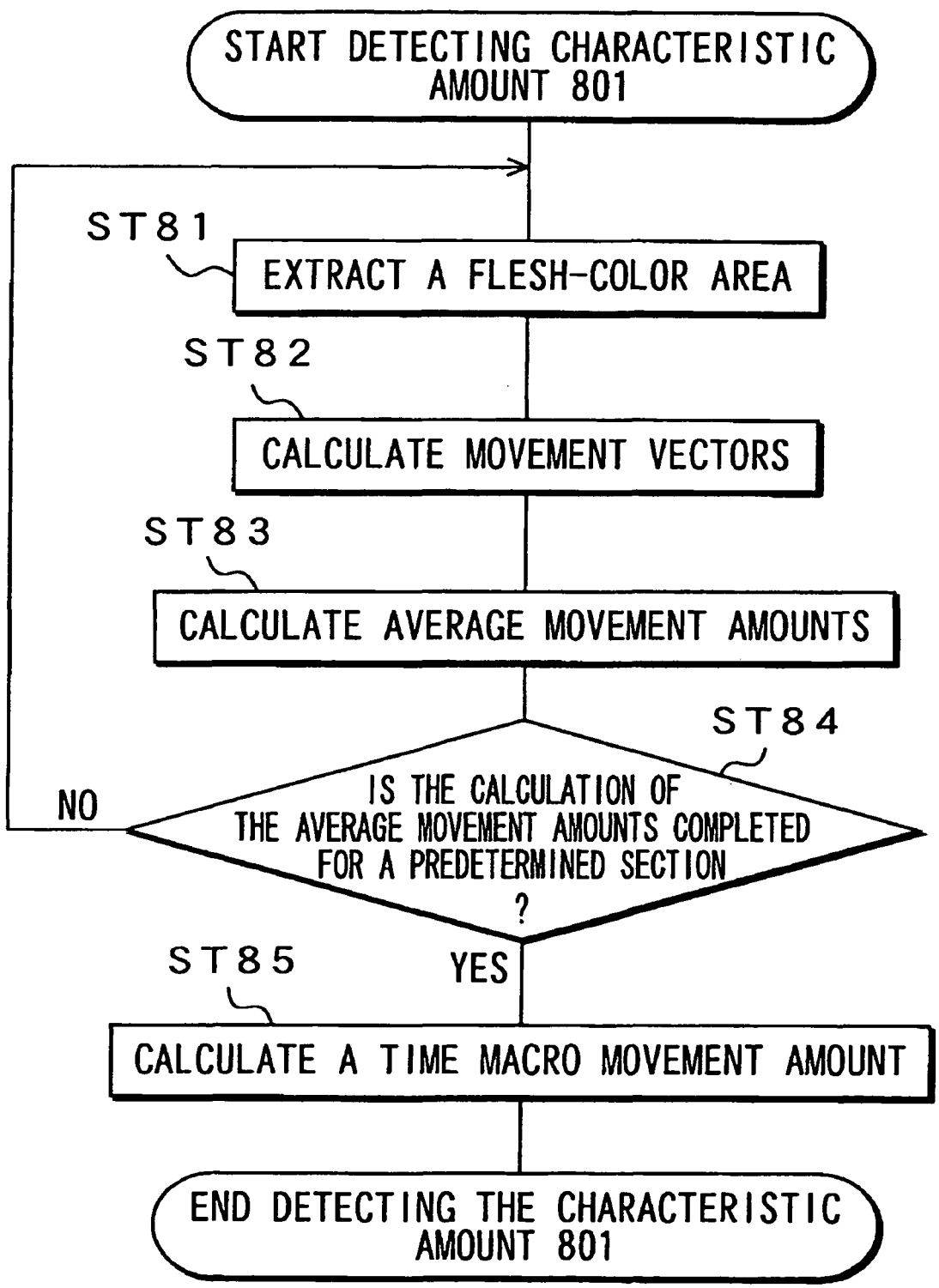
FIG. 53 is flow chart showing the detection processing for the characteristic amount 801.

In step ST81 of FIG. 53, a flesh-color area is extracted based on the video signal 211. In step ST82, a movement vector of the flesh-color area extracted in step ST81 is calculated for each block. In step ST83, based on the movement vector for each block calculated in step ST82, the movement amounts of the blocks are averaged for each frame, thereby calculating an average movement amount. In step ST84, it is determined whether the average movement amounts are calculated for a predetermined section set according to an audience state to be estimated. When they are not calculated for the predetermined section, the routine is returned to step ST81. When they are calculated for the predetermined section, the routine is advanced to step ST85. In step ST85, the average movement amounts for the predetermined section are averaged, thereby calculating a time macro movement amount. The time macro movement amount is set as the characteristic amount 801.

Figure 54:
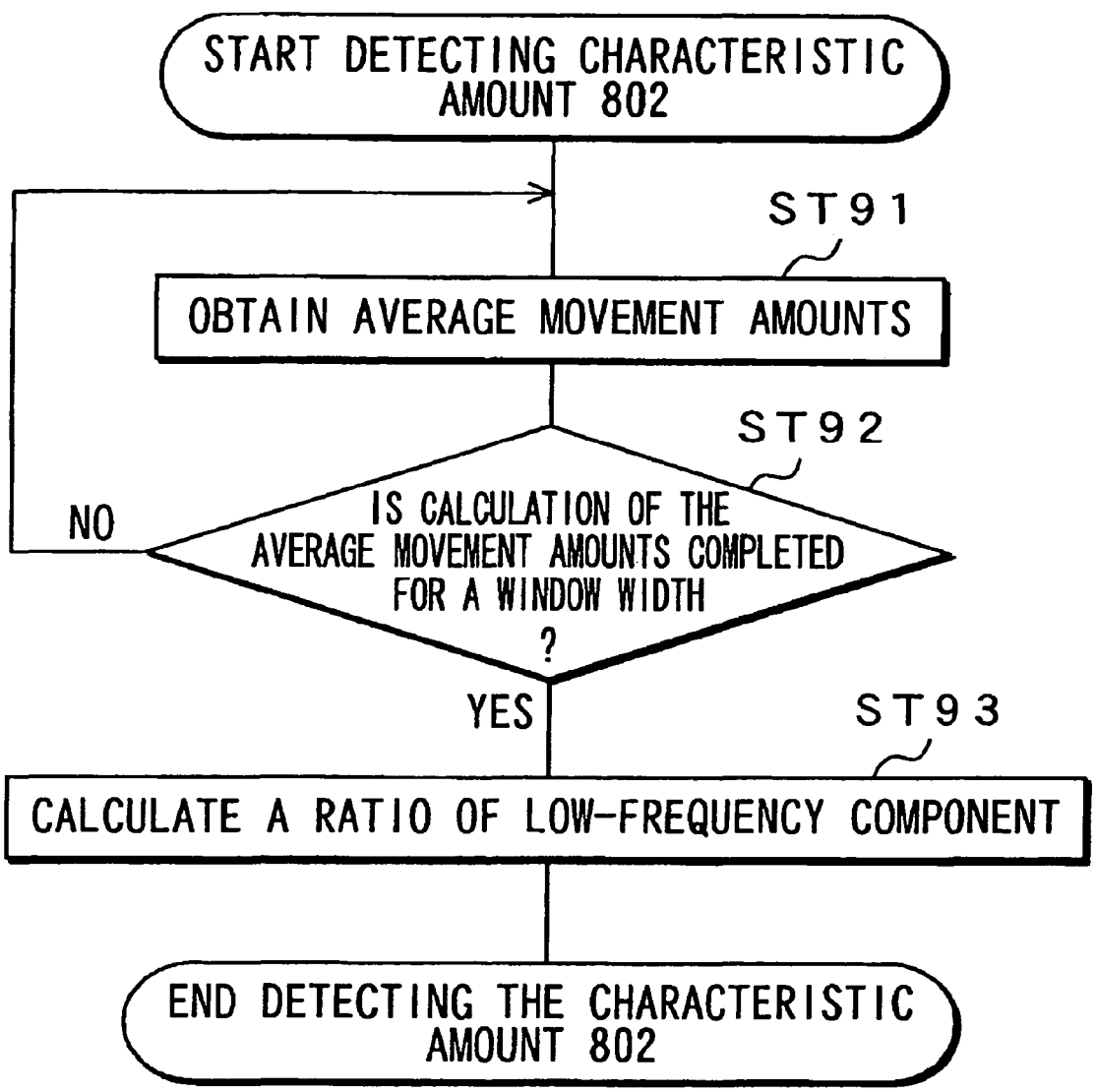
FIG. 54 is flow chart showing the detection processing for the characteristic amount 802.

In step ST91 of FIG. 54, the average movement amounts calculated in step ST83 are obtained. In step ST92, it is determined whether the average movement amounts are calculated for a window width. When they are not calculated for the window width, the routine is returned to step ST91. When they are calculated for the window width, the routine is advanced to step ST93. In step ST93, a ratio of low-frequency component is calculated from the average movement amounts for the window width. For example, Fourier transform and filter processing of the average movement amounts for the window width are performed so that the ratio of the power of the low-frequency component to all powers may be calculated as a ratio of low-frequency component. The ration of low-frequency component is set as the characteristic amount 802.

Figure 55:
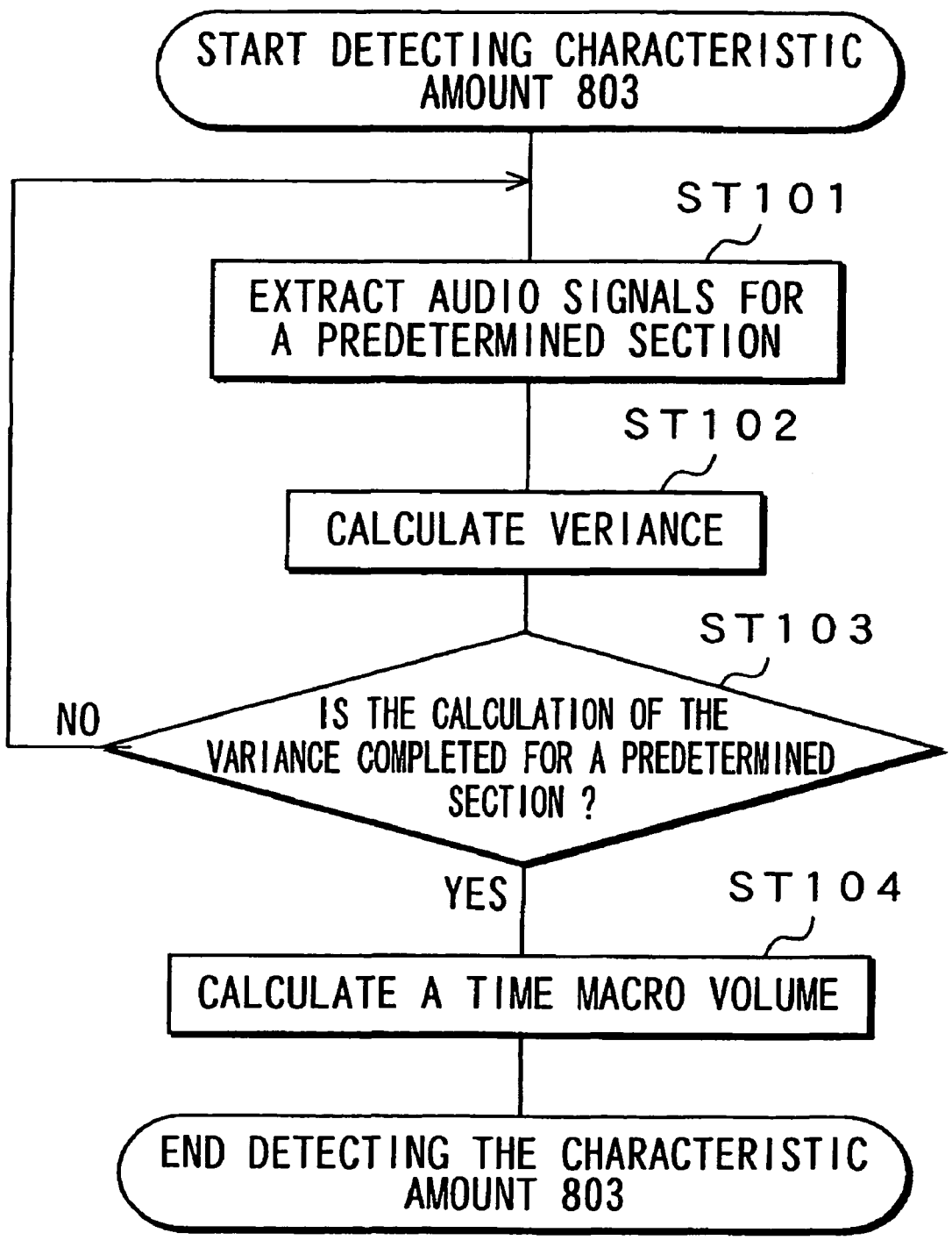
FIG. 55 is flow chart showing the detection processing for the characteristic amount 803.

In step ST101 of FIG. 55, the audio signals 221 for a frame period are extracted and the routine is advanced to step ST102. In step ST102, variance of the extracted audio signals 221 is calculated and the routine is advanced to step ST103. In step ST103, it is determined whether the variance is calculated for a predetermined period. When it is not calculated for the predetermined period, the routine is returned to step ST101. When it is calculated for the predetermined period, the routine is advanced to step ST104. In step ST104, an average of the variance for the predetermined period is calculated. The calculated time macro volume is set as the characteristic amount 803.

Figure 56:
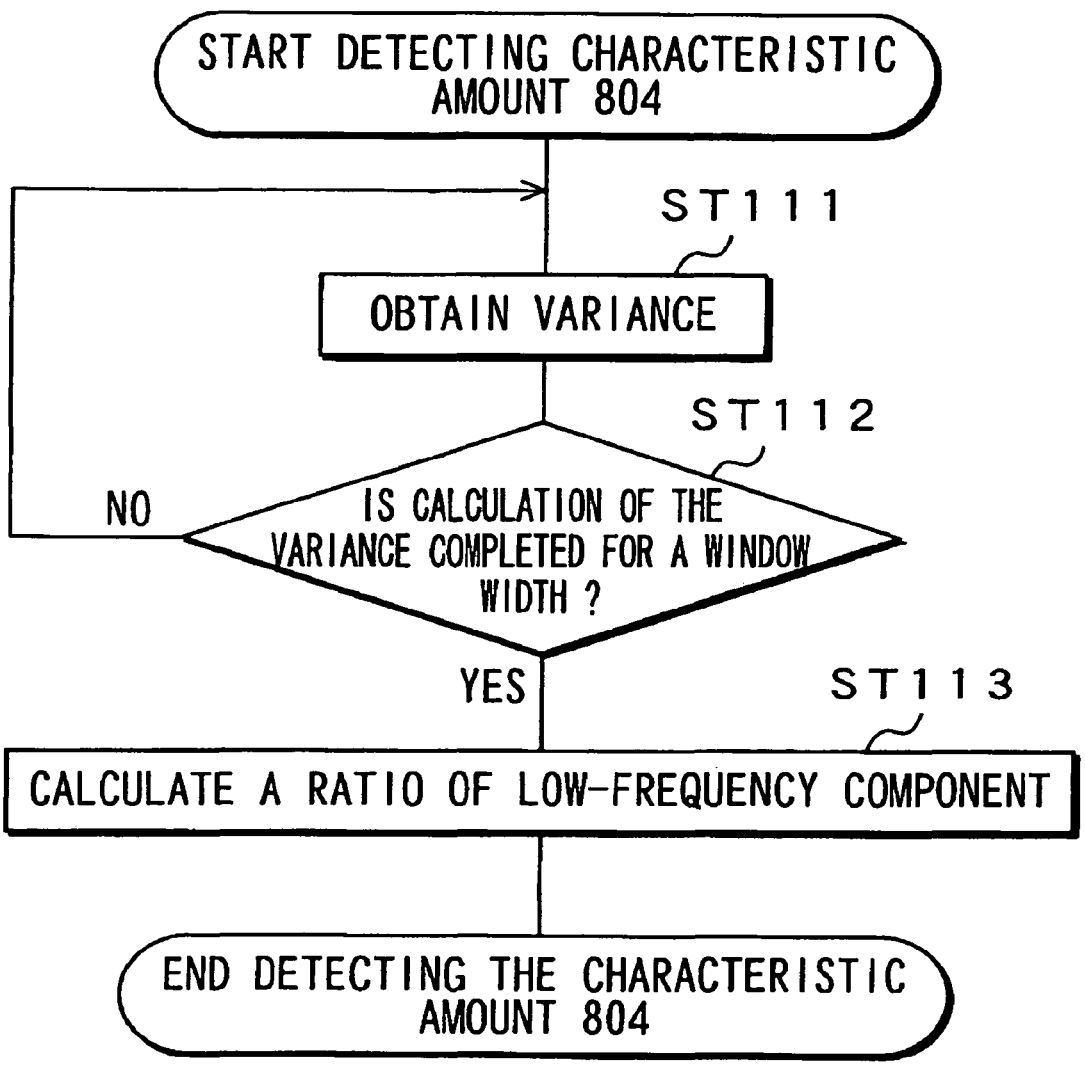
FIG. 56 is flow chart showing the detection processing for the characteristic amount 804.

In step ST111 of FIG. 56, the variance calculated in step ST102 is obtained. In step ST112, it is determined whether the variance is calculated for a window width. When it is not calculated for the window width, the routine is returned to step ST111. When it is calculated for the window width, the routine is advanced to step ST113. In step ST113, a ratio of a low-frequency component is calculated using the variance for the window width. For example, Fourier transform and filter processing of the variance for the window width are performed, thereby calculating the ratio of the power of the low-frequency component to all powers as the ratio of a low-frequency component. The ration of a low-frequency component is set as the characteristic amount 804.

Figure 57:
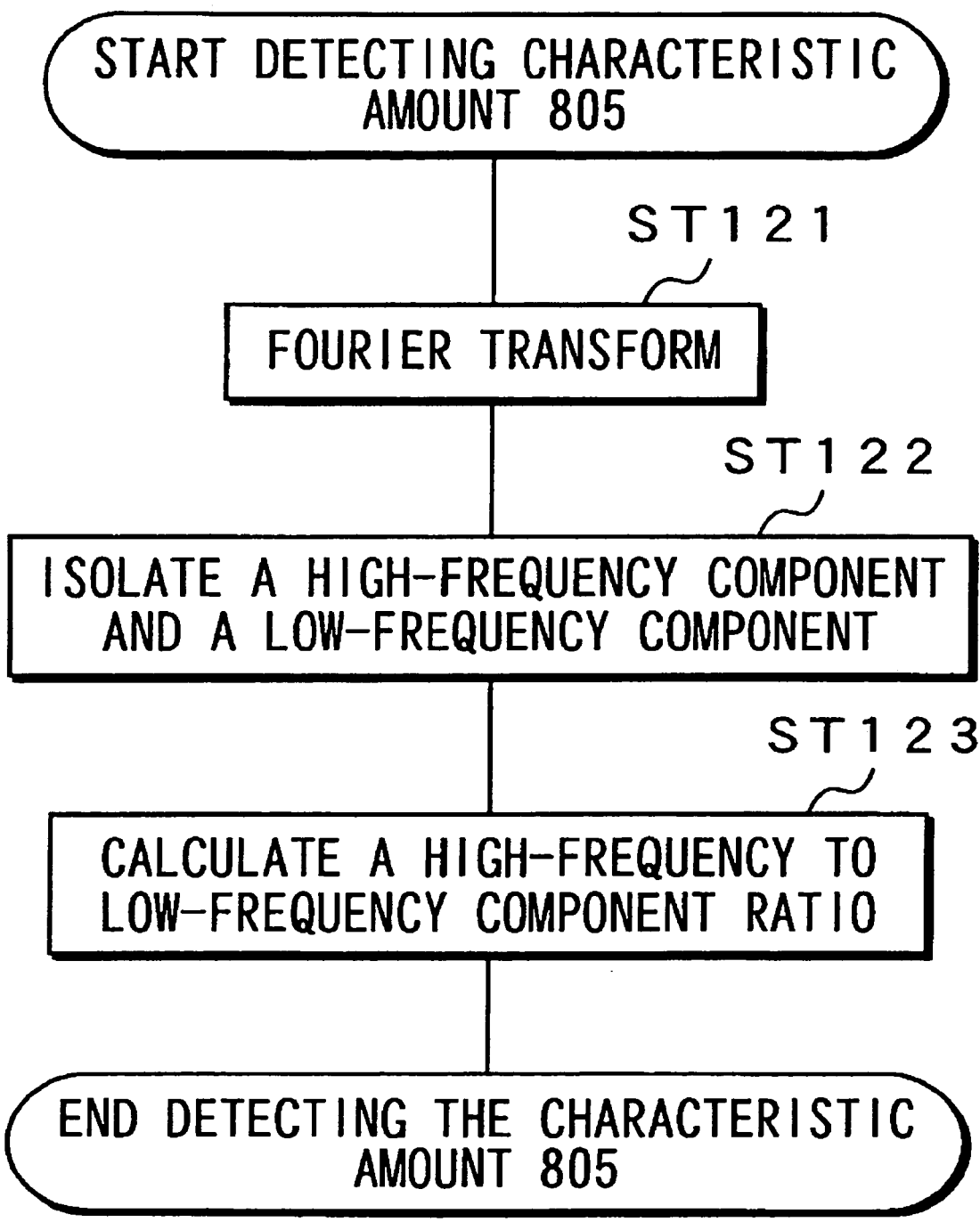
FIG. 57 is flow chart showing the detection processing for the characteristic amount 805.

In step ST121 of FIG. 57, the audio signals 221 for the window width are Fourier transformed. In step ST122, the high-frequency component and the low-frequency component are isolated based on the Fourier transformed result and the routine is advanced to step ST123. In step ST123, a high-frequency to low-frequency component ratio is calculated and the calculated high-frequency to low-frequency component ratio is set as the characteristic amount 805.

Thus, the movement amount and the low-frequency component of movement, the volume and the low-frequency component of sound, and the high-frequency to low-frequency component ratio of sound are detected as the characteristic amounts.

Figure 58:
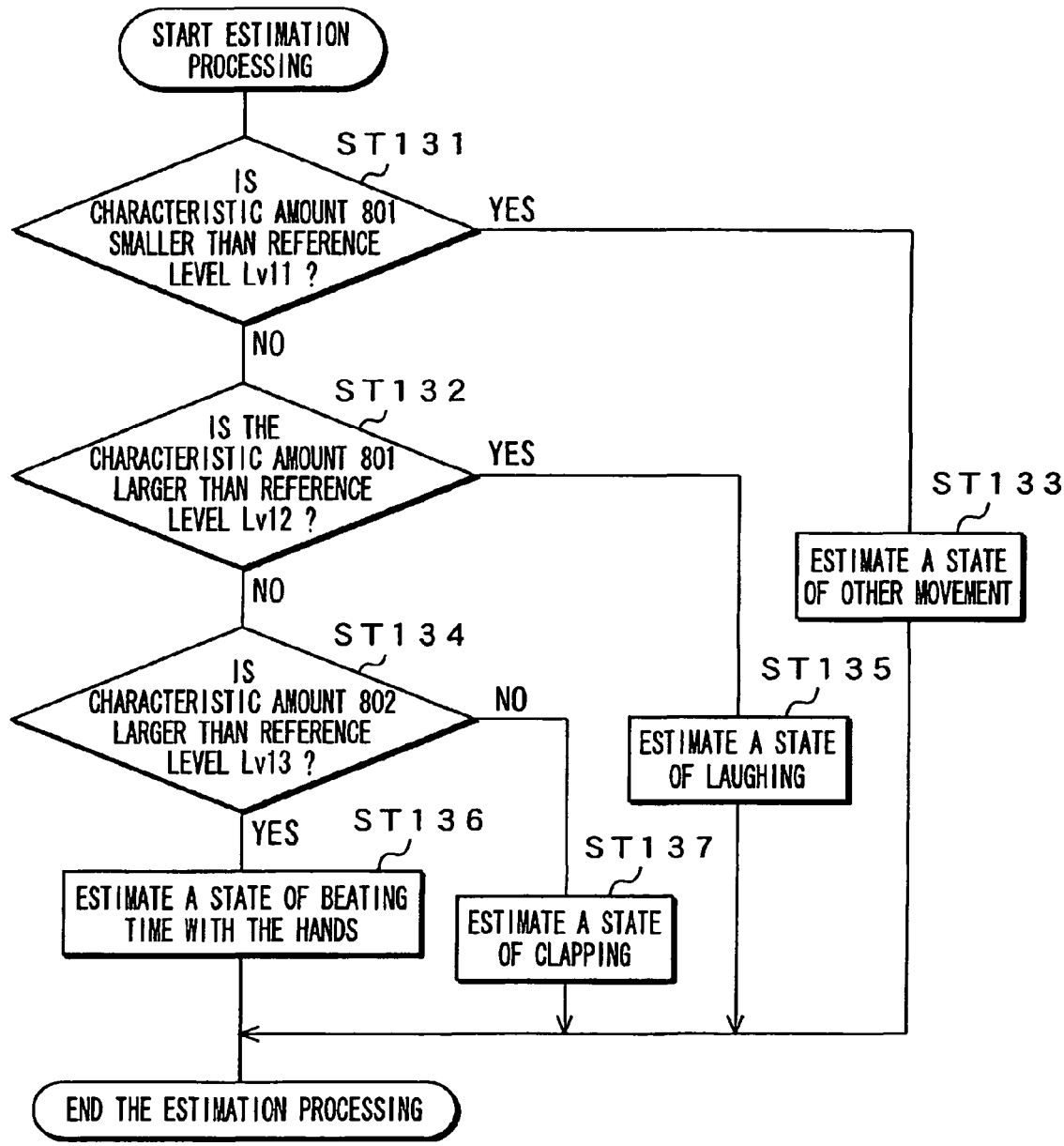
FIG. 58 is flow chart showing audience state estimation processing (not using the characteristic amount 805)

The audience state estimation processing based on the detected plural characteristic amounts is shown in FIGS. 58 and 59. FIG. 58 shows a case of not using the characteristic amount 805. FIG. 59 shows a case of using the characteristic amount 805.

In step ST131 of FIG. 58, it is determined whether the characteristic amount 801 showing a movement amount is not larger than the reference level Lv11. When the characteristic amount 801 is larger than the reference level Lv11, the routine is advanced to step ST132. When it is not larger than the reference level Lv11, the routine is advanced to step ST133 wherein it is estimated to be in the state of "other movement".

In step ST132, it is determined whether the characteristic amount 801 is larger than the reference level Lv12. When the characteristic amount 801 is not larger than the reference level Lv12, the routine is advanced to step ST134. When it is larger than the reference level La12, the routine is advanced to step ST135 wherein it is estimated to be in the state of "laughing".

In step ST134, it is determined whether the characteristic amount 802 showing periodicity of movement is larger than the reference level Lv13. When the characteristic amount 802 is larger than the reference level Lv13, the routine is advanced to step ST136 wherein it is estimated to be in the state of "beating time with the hands". When it is not larger than the reference level Lv13, the routine is advanced to step ST137 wherein it is estimated to be in the state of "clapping".

In FIG. 58, the audience state is estimated based on movement. The characteristic amounts 803 and 804 based on sound can be used to perform the same processing for estimating the audience state.

When using the high-frequency to low-frequency component ratio, in step ST141 of FIG. 59, it is determined whether the characteristic amount 801 showing a movement amount is not larger than the reference level Lv11. When the characteristic amount 801 is larger than the reference level Lv11, the routine is advanced to step ST142. When it is not larger than the reference level Lv11, the routine is advanced to step ST143 wherein it is estimated to be in the state of "other movement".

In step ST142, it is determined whether the characteristic amount 805 showing a high-frequency to low-frequency component ratio is larger than the reference level La14. When the characteristic amount 805 is larger than the reference level La14, the routine is advanced to step ST144. When it is not larger than the reference level La14, the routine is advanced to step ST145 wherein it is estimated to be in the state of "laughing".

In step ST144, it is determined whether the characteristic amount 802 showing periodicity of movement is larger than the reference level Lv13. When the characteristic amount 802 is larger than the reference level Lv13, the routine is advanced to step ST 146 wherein it is estimated to be in the state of "beating time with the hands". When it is not larger than the reference level Lv13, the routine is advanced to step ST147 wherein it is estimated to be in the state of "clapping". The characteristic amounts 803 and 804 based on sound including voice can be used to perform the same processing for estimating an audience state.

Thus, characteristic amounts are detected based on the frequency components of movement and sound so that the audience state can be estimated using the characteristic amounts. When the characteristic amounts are detected based on the frequency components of movement and sound, AND or OR of the estimated result of the characteristic amount based on the video signal and the estimated result of the characteristic amount based on the audio signal is calculated. When the estimated results are different, one estimated result can be obtained. As in FIG. 23, the characteristic amounts used for estimating the state of the audience 60 may be selected according to the contents provision state. An integrated value may be decided from plural characteristic amounts to compare the integrated value with a threshold value for estimating an audience state.

Thus has been described an audience state estimation system, an audience state estimation method, and an audience state estimation program, which embody the present invention. The present invention generates a video signal relative to an image of the imaged audience and/or an audio signal according to sound including voice from the audience, detects a movement amount and periodicity of movement of the audience based on the video signal, and detects information on a volume of sound, periodicity of the sound and a frequency component of the sound from the audience based on the audio signal. Thus, the audience state is estimated based on the detected result. Without observing the audience by a person to discriminate how its state is, an audience state can be easily estimated.

While the foregoing specification has described preferred embodiment(s) of the present invention, one skilled in the art may make many modifications to the preferred embodiment without departing from the invention in its broader aspects.

The appended claims therefore are intended to cover all such modifications as fall within the true scope and spirit of the invention.

What is claimed is:

1. An audience state estimation system comprising:
sound-obtaining device for obtaining sound from an audience and generating an audio signal according to the sound thus obtained;
volume detection device for detecting a volume of the sound from said audience based on said audio signal,
wherein the volume detection device calculates variance of volume of said audio signal for each frame, and averages the calculated variance of the volume in time direction to calculate a time macro volume, the number of frames averaged in calculating the time macro volume being set according to an audience state to be estimated; and
estimation device for estimating an audience state based on said volume.

2. The audience state estimation system according to claim 1, wherein said sound from the audience includes voice.

3. The audience state estimation system according to claim 1, wherein in said volume detection device, the variance of volume of said audio signal is set as said volume.

4. The audience state estimation system according to claim 1, wherein the time macro volume is set as said volume.

5. The audience state estimation system according to claim 1, wherein when said volume is larger than a predetermined level, said estimation device estimates said audience state to be in a state of laughing.

6. An audience state estimation system comprising:
sound-obtaining device for obtaining sound from an audience and generating an audio signal according to the sound thus obtained;
sound periodicity detection device for detecting sound periodicity from said audience based on said audio signal,
wherein the sound periodicity detection device calculates a ratio of a power of a low-frequency component to all powers a range of the low-frequency component being set according to the sound periodicity of a state to be detected; and
estimation device for estimating an audience state based on said sound periodicity.

7. The audience state estimation system according to claim 6, wherein said sound from the audience includes voice.

8. The audience state estimation system according to claim 6, wherein said sound periodicity detection device sequentially detects autocorrelation maximum positions from said audio signal, and wherein variance of the autocorrelation maximum position is set as said sound periodicity.

9. The audience state estimation system according to claim 6, further comprising volume detection device, wherein in said sound periodicity detection device, a ratio of low-frequency component to a time macro volume in a volume of the sound from said audience detected by said volume detection device based on said audio signal is set as said sound periodicity.

10. The audience state estimation system according to claim 9, wherein a frequency range of said low-frequency component is decided according to the sound periodicity to be detected.

11. The audience state estimation system according to claim 6, wherein when said sound periodicity is larger than a predetermined level, said estimation device estimates said audience state to be in a state of clapping.

12. An audience state estimation system comprising:
sound-obtaining device for obtaining sound from an audience and generating an audio signal according to the sound thus obtained;
spectrum detection device for performing Fourier transform on said audio signal and detecting a center of gravity of the Fourier transformed result,
wherein the spectrum detection device calculates the center of gravity for a time length as an average obtained by weighting power to frequency, the time length being set to include a frequency component corresponding to an audience state to be detected; and
estimation device for estimating an audience state based on said center of gravity.

13. The audience state estimation system according to claim 12, wherein said sound from the audience includes voice.

14. The audience state estimation system according to claim 12, wherein when said center of gravity is larger than a predetermined level, said estimation device estimates said audience state to be in any one of states of beating time with the hands and of clapping.

15. An audience state estimation system comprising:
sound-obtaining device for obtaining sound from an audience and generating an audio signal according to the sound thus obtained;
component ratio detection device for performing Fourier transform on said audio signal and detecting a high-frequency to low-frequency component ratio by calculating said ratio based on the Fourier transformed result,
wherein component ratio detection device sets a predetermined section according to an audience state to be estimated, and divides power for the predetermined section into a high-frequency component and a low-frequency component, and calculates the high-frequency to low-frequency component ratio; and
estimation device for estimating an audience state based on said high-frequency to low-frequency component ratio.

16. The audience state estimation system according to claim 15, wherein said sound from the audience includes voice.

17. The audience state estimation system according to claim 15, wherein when in said high-frequency to low-frequency component ratio, a ratio of said high-frequency component to said low-frequency component is larger than a predetermined level, said estimation device estimates said audience state to be in any one of states of beating time with the hands and of clapping.

18. An audience state estimation method comprising:
obtaining sound from an audience and generating an audio signal according to the sound thus obtained, utilizing a sound-obtaining device;
detecting a volume of the sound from said audience based on said audio signal and calculating variance of volume of said audio signal for each frame, and averaging the calculated variance of the volume in time direction to calculate a time macro volume, the number of frames averaged in calculating the time macro volume being set according to an audience state to be estimated, utilizing a volume detection device; and
estimating an audience state based on said volume, utilizing an estimation device.

19. The audience state estimation method according to claim 18, wherein said sound from the audience includes voice.

20. The audience state estimation method according to claim 18, wherein the variance of volume of said audio signal is set as said volume.

21. The audience state estimation method according to claim 18, wherein the time macro volume is set as said volume.

22. The audience state estimation method according to claim 18, wherein when said volume is larger than a predetermined level, said audience state is estimated to be in a state of laughing.

23. An audience state estimation method comprising:
obtaining sound from an audience and generating an audio signal according to the sound thus obtained, utilizing a sound-obtaining device;
detecting sound periodicity from said audience based on said audio signal and calculating a ratio of a power of a low-frequency component to all powers, a range of the low-frequency component being set according to the sound periodicity of a state to be detected; and
estimating an audience state based on said sound periodicity, utilizing estimation device.

24. The audience state estimation method according to claim 23, wherein said sound from the audience includes voice.

25. The audience state estimation method according to claim 23, wherein autocorrelation maximum positions are sequentially detected from said audio signal, and wherein variance of the autocorrelation maximum position is set as said sound periodicity.

26. The audience state estimation method according to claim 23, wherein a ratio of low-frequency component to the time macro volume in the volume of the sound from said audience detected based on said audio signal is set as said sound periodicity.

27. The audience state estimation method according to claim 23, wherein when said sound periodicity is larger than a predetermined level, said audience state is estimated to be in a state of clapping.

28. An audience state estimation method comprising:
obtaining sound from an audience and generating an audio signal according to the sound thus obtained, utilizing a sound-obtaining device;
performing Fourier transform on said audio signal and detecting a center of gravity of the Fourier transformed result, utilizing a spectrum detection device,
wherein the center of gravity is calculated for a time length as an average obtained by weighting power to frequency, the time length being set to include a frequency component corresponding to an audience state to be detected; and
estimating an audience state based on said center of gravity, utilizing estimation device.

29. The audience state estimation method according to claim 28, wherein said sound from the audience includes voice.

30. The audience state estimation method according to claim 29, wherein when said center of gravity is larger than a predetermined level, said audience state is estimated to be in any one of states of beating time with the hands and of clapping.

31. An audience state estimation method comprising:
obtaining sound from an audience and generating an audio signal according to the sound thus obtained, utilizing a sound-obtaining device;
performing Fourier transform on said audio signal, setting a predetermined section according to an audience state to be estimated, and dividing power for the predetermined section into a high-frequency component and a low-frequency component, and calculating the high-frequency to low-frequency component ratio based on the Fourier transformed result, utilizing a component ratio detection device; and
estimating an audience state based on said high-frequency to low-frequency component ratio, utilizing estimation device.

32. The audience state estimation method according to claim 31, wherein said sound from the audience includes voice.

33. The audience state estimation method according to claim 31, wherein when in said high-frequency to low-frequency component ratio, a ratio of said high-frequency component to said low-frequency component is larger than a predetermined level, said audience state is estimated to be in any one of states of beating time with the hands and of clapping.

* * * * *